(12) United States Patent
Ikeda et al.

(10) Patent No.: US 9,136,738 B2
(45) Date of Patent: Sep. 15, 2015

(54) ELECTRIC ROTATING MACHINE

(71) Applicants: DENSO CORPORATION, Kariya, Aichi-pref. (JP); NIPPON SOKEN, INC., Nishio, Aichi-pref. (JP)

(72) Inventors: Kazumasa Ikeda, Anjo (JP); Toru Wakimoto, Chiryu (JP); Yoshimitsu Takahashi, Chiryu (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 302 days.

(21) Appl. No.: 13/625,098

(22) Filed: Sep. 24, 2012

(65) Prior Publication Data

US 2013/0076188 A1  Mar. 28, 2013

(30) Foreign Application Priority Data

Sep. 24, 2011  (JP) ................................. 2011-208278
Jan. 27, 2012  (JP) ................................. 2012-015596
Jul. 2, 2012  (JP) ................................. 2012-148570

(51) Int. Cl.
*H02K 3/00* (2006.01)
*H02K 3/28* (2006.01)

(52) U.S. Cl.
CPC ........................................ *H02K 3/28* (2013.01)

(58) Field of Classification Search
CPC ......................................................... H02K 3/28
USPC ........................... 310/179, 180, 195, 201, 208
See application file for complete search history.

(56) References Cited

U.S. PATENT DOCUMENTS

| 5,936,326 A | 8/1999 | Umeda et al. |
| 6,285,105 B1 | 9/2001 | Asao et al. |
| 6,507,137 B2 | 1/2003 | Asao et al. |
| 6,995,492 B1* | 2/2006 | Kouda et al. ............... 310/254.1 |
| 2002/0047450 A1 | 4/2002 | Asao et al. |
| 2003/0230949 A1 | 12/2003 | Ogawa et al. |

(Continued)

FOREIGN PATENT DOCUMENTS

| CN | 101132138 | 2/2008 |
| JP | 2000-069729 | 3/2000 |
| JP | 2001-169491 | 6/2001 |

(Continued)

OTHER PUBLICATIONS

Office Action (2 pages) dated Aug. 20, 2013, issued in corresponding Japanese Application No. 2012-015596 and English translation (3 pages).

(Continued)

*Primary Examiner* — Hanh Nguyen
(74) *Attorney, Agent, or Firm* — Nixon & Vanderhye P.C.

(57) ABSTRACT

An electric rotating machine includes a rotor and a stator. The rotor has a plurality of pairs of magnetic poles. The stator includes a stator core and a stator coil that is comprised of a plurality of phase windings wound on the stator core. The stator core has, for each of the phase windings of the stator coil, n circumferentially-consecutive single-phase slots, in which only the phase winding is received, per magnetic pole of the rotor, where n is a natural number not less than 2. Each of the phase windings of the stator coil has first to kth sections that are sequentially arranged from one end to the other end of the phase winding, where k is a natural number not less than 2. The first section is received in different ones of the single-phase slots for the phase winding from the kth section.

6 Claims, 21 Drawing Sheets

(56) References Cited

U.S. PATENT DOCUMENTS

2004/0164637 A1* 8/2004 Seguchi .................. 310/180
2011/0260570 A1* 10/2011 Taniguchi et al. ............ 310/201

FOREIGN PATENT DOCUMENTS

| | | |
|---|---|---|
| JP | 2004-048941 | 2/2004 |
| JP | 2004-064914 | 2/2004 |
| JP | 2008-035580 | 2/2008 |

OTHER PUBLICATIONS

Office Action (2 pages) dated Aug. 20, 2013, issued in corresponding Japanese Application No. 2012-148570 and English translation (3 pages).

Office Action (11 pages) dated Aug. 19, 2014, issued in corresponding Chinese Application No. 201210359533.X and English translation (10 pages).

* cited by examiner

RADIALLY OUTSIDE

N ← 1 MAGNETIC POLE PITCH → S
(CIRCUMFERENTIAL DIRECTION)

RADIALLY INSIDE

RADIALLY OUTSIDE

| U1 | U2 |
|----|----|
| a  | c  |
| b  | d  |
| a  | c  |
| b  | d  |
| a  | c  |
| b  | d  |

| U1 | U2 |
|----|----|
| b  | d  |
| a  | c  |
| b  | d  |
| a  | c  |
| b  | d  |
| a  | c  |

N ← 1 MAGNETIC POLE PITCH → S
(CIRCUMFERENTIAL DIRECTION)

RADIALLY INSIDE

AXIALLY OVERLAPPING IN 4 LAYERS

AXIALLY OVERLAPPING IN 4 LAYERS

AXIALLY OVERLAPPING IN 6 LAYERS

ELECTRIC ROTATING MACHINE

CROSS-REFERENCE TO RELATED APPLICATIONS

This application is based on and claims priority from Japanese Patent Applications No. 2011-208278 filed on Sep. 24, 2011, No. 2012-15596 filed on Jan. 27, 2012, and No. 2012-148570 filed on Jul. 2, 2012, the contents of which are hereby incorporated by reference in their entireties into this application.

BACKGROUND

1. Technical Field

The present invention relates to electric rotating machines that are used in, for example, motor vehicles as electric motors and electric generators.

2. Description of the Related Art

There are known electric rotating machines which include a rotor and a stator. The rotor has a plurality of pairs of magnetic poles that are arranged in a circumferential direction of the rotor. The stator includes a stator core and a stator coil. The stator core has a plurality of slots, which are arranged in a circumferential direction of the stator core, and is radially opposed to the rotor. The stator coil is comprised of a plurality of phase windings each of which is wound on the stator core so as to be inserted in corresponding ones of the slots of the stator core.

Moreover, to secure high output of the electric rotating machine, the stator core is configured to have, for each of the phase windings of the stator coil, a plurality of circumferentially-consecutive single-phase slots, in which only the phase winding is received, per magnetic pole of the rotor.

For example, Japanese Patent Application Publication No. 2000-69729 (to be simply referred to as Patent Document 1 hereinafter) discloses a three-phase stator coil that is wave-wound on a stator core that has two single-phase slots per phase winding of the stator coil and per magnetic pole of the rotor.

More specifically, as shown in FIG. 26A, the stator coil is comprised of a U-phase winding, a V-phase winding and a W-phase winding. Each of the U-phase, V-phase and W-phase windings includes a first section (a), a second section (b), a third section (c) and a fourth section (d). The four sections (a)-(d) are sequentially arranged from a terminal of the phase winding at one end of the phase winding to a neutral point of the stator coil at the other end of the phase winding. Further, taking only the U-phase winding as an example, as shown in FIG. 26B, the first section (a) and the fourth section (d) of the U-phase winding are received in the same single-phase slots U1 of the stator core, while the second section (b) and the third section (c) of the U-phase winding are received in the same single-phase slots U2 of the stator core. That is, the first and fourth sections (a) and (d) are received in different ones of the single-phase slots for the U-phase winding from the second and third sections (b) and (c). Here, the single-phase slots U1 are circumferentially spaced from one another by one magnetic pole pitch (i.e., a pitch between the N and S magnetic poles of the rotor); the single-phase slots U2 are also circumferentially spaced from one another by one magnetic pole pitch; each of the single-phase slots U1 is positioned immediately adjacent to one of the single-phase slots U2. In addition, it should be noted that the V-phase and W-phase windings of the stator coil are wound on the stator core in the same manner as the U-phase winding.

Japanese Patent Application Publication No. 2004-64914 (to be simply referred to as Patent Document 2 hereinafter) discloses a three-phase stator coil that is wound on a stator core in a manner that is a hybrid of a lap winding manner and a wave winding manner. The stator core has three single-phase slots per phase winding of the stator coil and per magnetic pole of the rotor. Further, in each slot of the stator core, the stator coil is received in six layers in a radial direction of the stator core. More specifically, the stator coil is first lap-wound around the stator core so as to fill the radially-inside four layers in each slot of the stator core and then wave-wound around the stator core so as to fill the radially-outside two layers in each slot of the stator core. Furthermore, each phase winding of the stator coil includes first to sixth sections. For each phase winding of the stator coil, the first section and the sixth section (i.e., the last section) of the phase winding are received in the same single-phase slots for the phase winding.

That is, in both Patent Document 1 and Patent Document 2, for each phase winding of the stator coil, the first and the last sections of the phase winding are received in the same single-phase slots for the phase winding.

INVESTIGATION BY THE INVENTORS

The inventors of the present invention have investigated the reason why the configurations of receiving the first and the last sections of each phase winding in the same single-phase slots for the phase winding have so far been used in the art.

Specifically, in terms of minimizing the protruding heights of coil ends of the stator coil from corresponding axial end faces of the stator core, it is preferable to locate all of the terminals and neutral point of the stator coil radially outside of the stator core. Here, the coil ends denote those parts of the stator coil which are located outside of the slots of the stator core and respectively protrude from the corresponding axial end faces of the stator core.

Further, for locating all of the terminals and neutral point of the stator coil radially outside of the stator core, it is necessary to arrange an even number of bridging wires to radially cross over one coil end of the stator coil. In particular, when the stator core has two single-phase slots per phase winding of the stator coil and per magnetic pole of the rotor, it is necessary to arrange either zero (i.e., no) or six (i.e., two per phase winding) bridging wires to cross over the coil end of the stator coil.

In cases where the number of bridging wires radially crossing over the coil end is equal to zero, the phase windings of the stator coil overlap each other in six layers in the axial direction of the stator core regardless of the positions of the sections of the phase windings in the slots of the stator core. Moreover, in those cases, the number of types (or shape patterns) of the bridging wires used in the stator coil is equal to nine.

More specifically, FIG. 27A illustrates a case where for each phase winding of the stator coil, the first section (a) and the fourth section (d) of the phase winding are received in the same single-phase slots while the second section (b) and the third section (c) of the phase winding are received in the same single-phase slots. FIG. 27B illustrates another case where for each phase winding of the stator coil, the first section (a) and the second section (b) of the phase winding are received in the same single-phase slots while the third section (c) and the fourth section (d) of the phase winding are received in the same single-phase slots. In either of those cases shown in FIGS. 27A-27B, six different types of bridging wires are arranged on the radially inner periphery of the stator coil to bridge corresponding pairs of the first to the fourth sections (a)-(d) of each phase winding of the stator coil. On the other hand, three different types of the bridging wires are arranged on the radially outer periphery of the stator core to bridge corresponding pairs of the first to the fourth sections (a)-(d) of each phase winding of the stator coil. However, there is no bridging wire that radially crosses over the coil end of the stator coil. Accordingly, the total number of types of the bridging wires used in the stator coil is equal to nine. Further, the bridging wires of the stator coil overlap each other in six layers in the axial direction of the stator core.

In addition, it should be noted that though there are depicted six bridging wires in FIGS. 27A-27B as extending on the radially inside of the stator core, those bridging wires actually extend over the coil end of the stator coil without protruding radially inward from the stator core. It also should be noted that the number of bridging wires radially crossing over the coil end cannot be equal to zero in cases where for each phase winding of the stator coil, the first section (a) and the third section (c) of the phase winding are received in the same single-phase slots while the second section (b) and the fourth section (d) of the phase winding are received in the same single-phase slots.

On the other hand, FIGS. 28A-28C illustrate three cases where the number of bridging wires radially crossing over the coil end is equal to six.

More specifically, FIG. 28C illustrates a case where for each phase winding of the stator coil, the first section (a) and the second section (b) of the phase winding are received in the same single-phase slots while the third section (c) and the fourth section (d) of the phase winding are received in the same single-phase slots. In this case, there are six bridging wires that radially cross over the coil end of the stator coil. Further, all the bridging wires used in the stator coil overlap each other in six layers in the axial direction of the stator core. In addition, the total number of types of the bridging wires used in the stator coil is equal to eight.

FIG. 28B illustrates another case where for each phase winding of the stator coil, the first section (a) and the third section (c) of the phase winding are received in the same single-phase slots while the second section (b) and the fourth section (d) of the phase winding are received in the same single-phase slots. In this case, there are six bridging wires that radially cross over the coil end of the stator coil. Further, all the bridging wires used in the stator coil overlap each other in four layers in the axial direction of the stator core. In addition, the total number of types of the bridging wires used in the stator coil is reduced to five.

FIG. 28A illustrates still another case where for each phase winding of the stator coil, the first section (a) and the fourth section (d) of the phase winding are received in the same single-phase slots while the second section (b) and the third section (c) of the phase winding are received in the same single-phase slots. In this case, there are six bridging wires that radially cross over the coil end of the stator coil. Further, all the bridging wires used in the stator coil overlap each other in four layers in the axial direction of the stator core. In addition, the total number of types of the bridging wires used in the stator coil is further reduced to four.

Among all the stator configurations shown in FIGS. 27A-27B and 28A-28C, the configuration shown in FIG. 28A is most preferable in terms of minimizing the axial length of the stator coil and facilitating the manufacture of the stator. Accordingly, for the above reason, the configurations of receiving the first and the last sections of each phase winding in the same single-phase slots for the phase winding have been widely used in the art.

However, the inventors of the present invention also have found a problem with stator coils of electric rotating machines.

Specifically, for an electric motor, when a square wave voltage, whose maximum voltage is equal to $V_0$ as shown in FIG. 29, is applied between the terminals of phase windings of the stator coil of the motor, the actual maximum phase-to-phase voltage of the stator coil (i.e., the actual maximum voltage across any two of the phase windings of the stator coil) exceeds $V_0$ due to voltage surge as shown in FIG. 30.

FIG. 31 illustrates the change in the amplification ratio of the actual maximum phase-to-phase voltage of the stator coil to the maximum voltage $V_0$ with frequency.

It can be seen from FIG. 31 that the amplification ratio reaches its peak when the stator coil has a resonant frequency with respect to harmonic components of the square wave voltage applied between the terminals of the phase windings of the stator coil.

Further, when the maximum phase-to-phase voltage of the stator coil is amplified, there may occur necessity to increase the phase-to-phase clearance of the stator coil (e.g., by increasing the thickness of insulating coats of the phase windings of the stator coil) and thereby improve electrical insulation between the phase windings, so as to prevent short circuits from occurring between the phase windings.

SUMMARY OF THE INVENTION

According to one exemplary embodiment, an electric rotating machine is provided which includes a rotor and a stator. The rotor has a plurality of pairs of magnetic poles that are arranged in a circumferential direction of the rotor. The stator includes a stator core and a stator coil. The stator core has a plurality of slots, which are arranged in a circumferential direction of the stator core, and is radially opposed to the rotor. The stator coil is comprised of a plurality of phase windings each of which is wound on the stator core so as to be inserted in corresponding ones of the slots of the stator core. Further, according to this embodiment, the stator core has, for each of the phase windings of the stator coil, n circumferentially-consecutive single-phase slots, in which only the phase winding is received, per magnetic pole of the rotor, where n is a natural number greater than or equal to 2. Each of the phase windings of the stator coil has k sections including a first section and a kth section, where k is a natural number greater than or equal to 2. The first to the kth sections are sequentially arranged from one end to the other end of the phase winding. The first section is received in different ones of the single-phase slots for the phase winding from the kth section.

With the above configuration, the negative mutual inductance between the first and the kth sections can be minimized, thereby minimizing the decrease in the total inductance of the stator coil due to the negative mutual inductance. Consequently, it is possible to lower both the resonant frequency and the resonance peak of the stator coil. As a result, it is possible to lower the maximum phase-to-phase voltage of the stator coil, thereby shortening the necessary phase-to-phase clearance of the stator coil for ensuring electrical insulation between the phase windings of the stator coil.

According to another exemplary embodiment, an electric rotating machine is provided which includes a rotor and a stator. The stator includes a stator core and a stator coil. The stator core has a plurality of slots, which are arranged in a circumferential direction of the stator core, and is radially opposed to the rotor. The stator coil is comprised of a plurality of phase windings each of which is wound on the stator core so as to be inserted in corresponding ones of the slots of the stator core. Further, according to this embodiment, each of the phase windings of the stator coil includes k sections that are sequentially arranged from one end of the phase winding to the other end of the phase winding, where k is a natural number greater than or equal to 2. Each of the k sections is wound on the stator core in such as a manner that a circumferential advancing direction of the section is reversed for each completion of a circumferential advancement of 360°/k.

With the above configuration, for each of the phase windings of the stator coil, the k sections of the phase winding can be separately received in different ones of the corresponding slots to the phase winding from each other. Consequently, it is possible to weaken the magnetic coupling between the k sections of the phase winding, thereby minimizing the negative mutual inductances therebetween. Thus, it is possible to minimize the decrease in the total inductance of the stator coil due to the negative mutual inductances, thereby lowering both the resonant frequency and the resonance peak of the stator coil. As a result, it is possible to lower the maximum phase-to-phase voltage of the stator coil, thereby shortening the necessary phase-to-phase clearance of the stator coil for ensuring electrical insulation between the phase windings of the stator coil.

According to yet another exemplary embodiment, an electric rotating machine is provided which includes a rotor and a stator. The stator includes a stator core and a stator coil. The stator core has a plurality of slots, which are arranged in a circumferential direction of the stator core, and is radially opposed to the rotor. The stator coil is comprised of a plurality of phase windings each of which is wound on the stator core so as to be inserted in corresponding ones of the slots of the stator core. Further, according to this embodiment, each of the phase windings of the stator coil is comprised of j sub-windings that are connected in parallel with each other between opposite ends of the phase winding, where j is a natural number greater than or equal to 2. Each of the sub-windings includes k sections that are sequentially arranged from one end of the sub-winding to the other end of the sub-winding, where k is a natural number greater than or equal to 2. Counting from one end of the phase winding, the same-numbered sections of the sub-windings of the phase winding are received in the same ones of the corresponding slots to the phase winding so as to be proximate to one another in the corresponding slots.

With the above configuration, for each of the phase windings of the stator coil, the first sections of the sub-windings of the phase winding can be radially separated from the kth sections of the sub-windings, thereby weakening the magnetic coupling between the first sections and the kth sections. Consequently, it is possible to minimize the decrease in the total inductance of the stator coil due to the negative mutual inductances between the first sections and the kth sections, thereby lowering both the resonant frequency and the resonance peak of the stator coil. As a result, it is possible to lower the maximum phase-to-phase voltage of the stator coil, thereby shortening the necessary phase-to-phase clearance of the stator coil for ensuring electrical insulation between the phase windings of the stator coil.

According to still another exemplary embodiment, an electric rotating machine is provided which includes a rotor and a stator. The rotor has a plurality of pairs of magnetic poles that are arranged in a circumferential direction of the rotor. The stator includes a stator core and a stator coil. The stator core has a plurality of slots, which are arranged in a circumferential direction of the stator core, and is radially opposed to the rotor. The stator coil is comprised of a plurality of phase windings each of which is wound on the stator core so as to be inserted in corresponding ones of the slots of the stator core. Further, according to this embodiment, the stator core has, for each of the phase windings of the stator coil, 2j circumferentially-consecutive single-phase slots, in which only the phase winding is received, per magnetic pole of the rotor, where j is a natural number greater than or equal to 2. Each of the phase windings of the stator coil is comprised of j sub-windings that are connected in parallel with each other between opposite ends of the phase winding. Each of the sub-windings consists of a first half on the side of one end of the phase winding and a second half on the side of the other end of the phase winding. For each of the phase windings of the stator coil, all the first and second halves of the sub-windings of the phase winding are separately received in different ones of the single-phase slots for the phase winding from each other.

With the above configuration, for each of the sub-windings of the phase windings of the stator coil, the first and second halves of the sub-winding are respectively received in two different single-phase slots for the phase winding. Consequently, it is possible to weaken the magnetic coupling between the first and second halves of the sub-winding, thereby minimizing the negative mutual inductance therebetween. Thus, it is possible to minimize the decrease in the total inductance of the stator coil due to the negative mutual inductance, thereby lowering both the resonant frequency and the resonance peak of the stator coil. As a result, it is possible to lower the maximum phase-to-phase voltage of the stator coil, thereby shortening the necessary phase-to-phase clearance of the stator coil for ensuring electrical insulation between the phase windings of the stator coil.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 29 is applied between the terminals of the phase windings.

DESCRIPTION OF EMBODIMENTS

Figure 1:
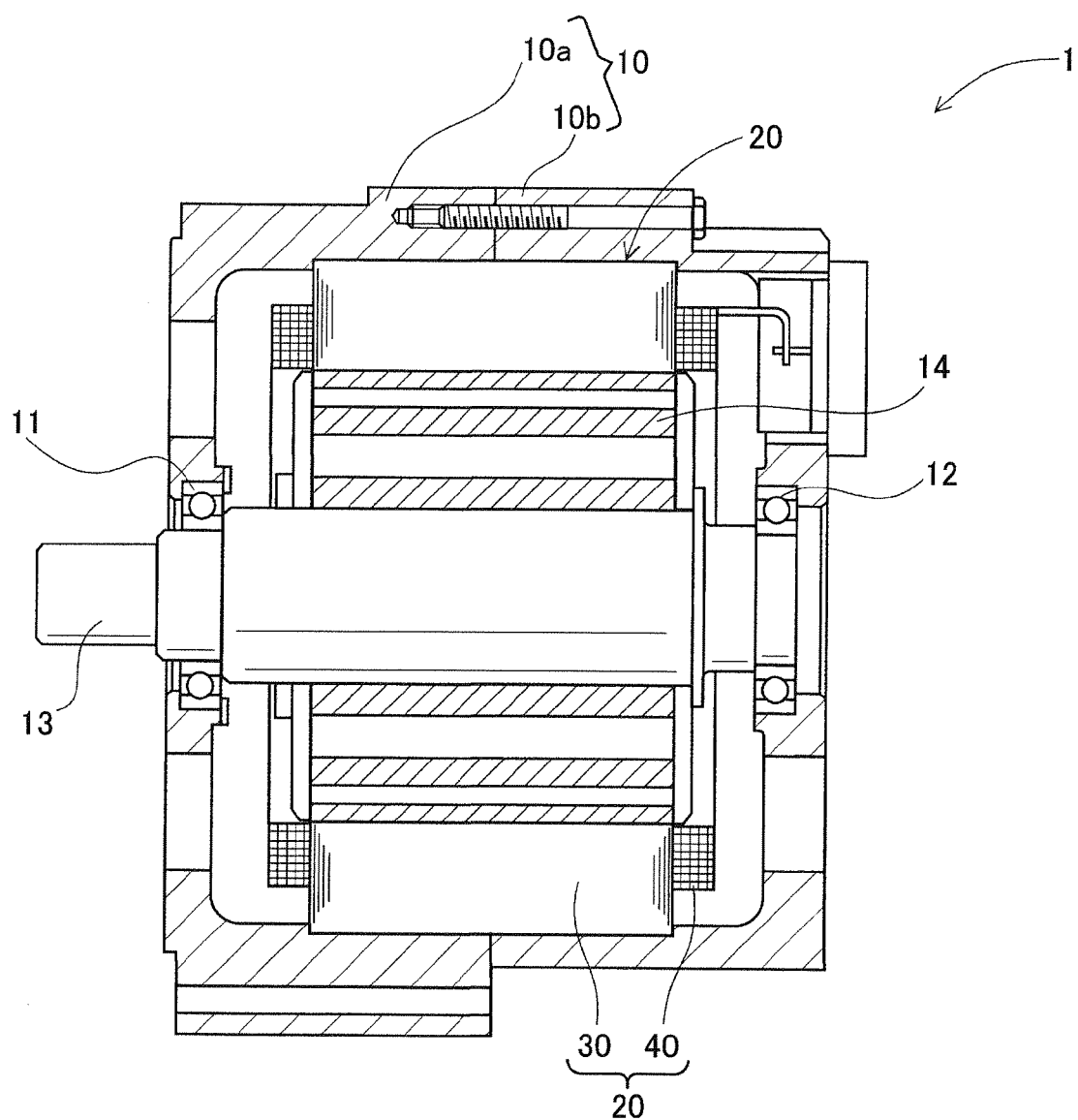
FIG. 1 is a partially cross-sectional view illustrating the overall configuration of an electric rotating machine according to a first embodiment.

Exemplary embodiments will be described hereinafter with reference to FIGS. 1-25. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 according to a first embodiment. The electric rotating machine 1 is designed to be used in a motor vehicle to function as an electric motor.

As shown in FIG. 1, the electric rotating machine 1 includes a housing 10, a rotor 14 and a stator 20. The housing 10 is comprised of a pair of substantially cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that are embedded at predetermined positions in the rotor 14. The permanent magnets form a plurality of pairs of N and S magnetic poles on the radially outer periphery of the rotor 14 to face the radially inner periphery of the stator 20. The magnetic poles are spaced from one another at a predetermined pitch in the circumferential direction of the rotor 14. Further, the polarities of the magnetic poles alternate between north (N) and south (S) in the circumferential direction. In addition, the number of the magnetic poles can be suitably set according to the design specification of the electric rotating machine 1. For example, in the present embodiment, the number of the magnetic poles is set to be equal to eight (i.e., four N poles and four S poles).

Figure 2:
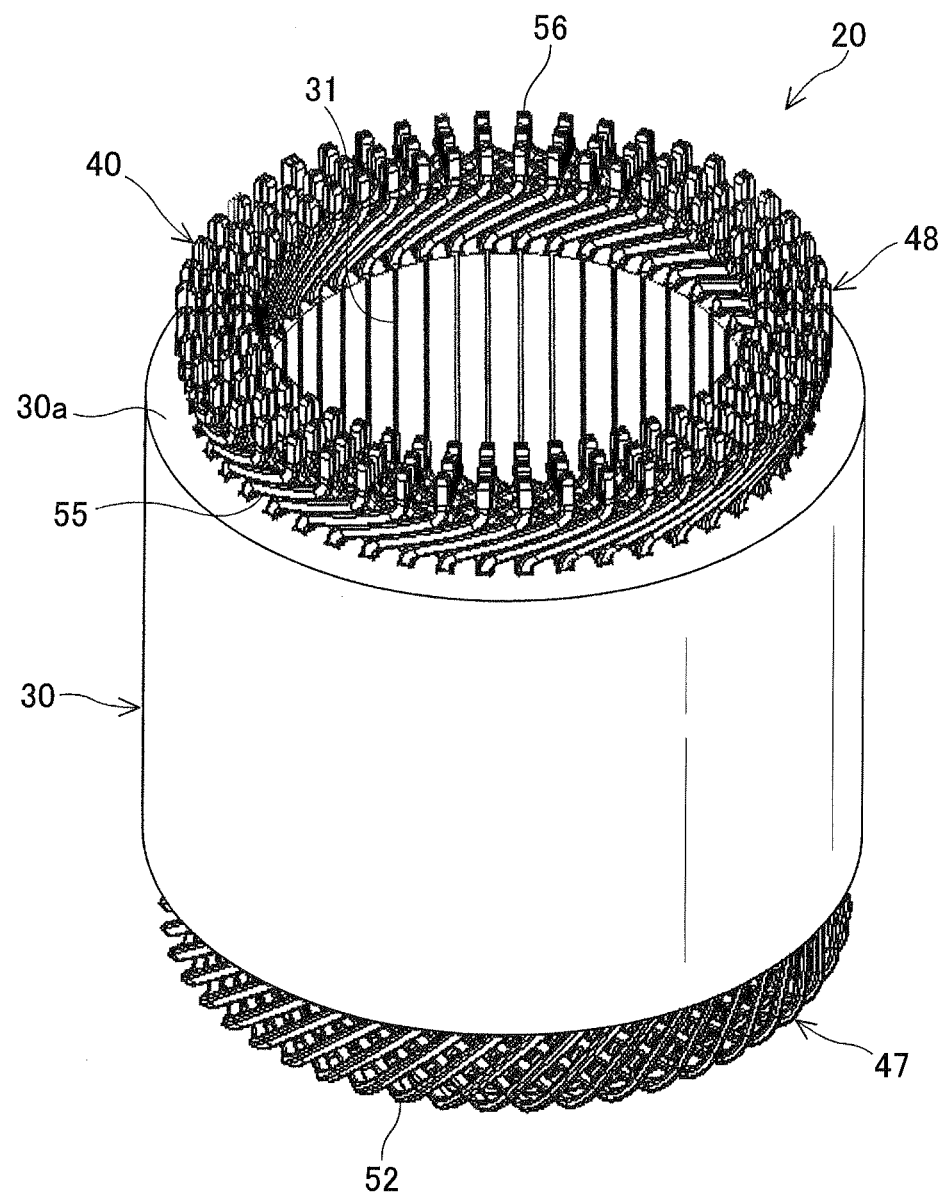
FIG. 2 is a perspective view of a stator of the electric rotating machine.

Referring now to FIG. 2, the stator 20 includes a substantially annular stator core 30 and a three-phase stator coil 40 that is comprised of a U-phase winding, a V-phase winding and a W-phase winding.

The stator core 30 is formed by, for example, laminating a plurality of core sheets (or steel sheets) in the axial direction of the stator core 30. The stator core 30 has a plurality of slots 31 that are formed in a radially inner surface of the stator core 30 and spaced from one another in the circumferential direction of the stator core 30 at a constant pitch. Each of the slots 31 extends in the axial direction of the stator core 30 so as to penetrate the stator core 30 in the axial direction and has a substantially rectangular cross section perpendicular to the axial direction. For each of the slots 31, the depth-wise direction of the slot 31 is coincident with a radial direction of the stator core 30.

In the present embodiment, there are provided two slots 31 (or n slots 31, where n is equal to 2) per magnetic pole of the rotor 14 that has the eight magnetic poles and per phase of the three-phase stator coil 40. That is, the stator core 30 has, for each of the U-phase, V-phase and W-phase windings of the stator coil 40, two circumferentially-consecutive single-phase slots, in which only the phase winding is received, per magnetic pole of the rotor 14. Accordingly, the total number of the slots 31 provided in the stator core 30 is equal to 48 (i.e., 2×3×8).

Each of the U-phase, V-phase and W-phase windings of the stator coil 40 is formed by inserting a plurality of substantially U-shaped electric conductor segments 50 into corresponding slots 31 of the stator core 30 from one axial side of the stator core 30 and welding corresponding pairs of free ends of the electric conductor segments 50 on the other axial side of the stator core 30. Each of the electric conductor segments 50 is obtained by bending a rectangular electric conductor, which has an insulating coat (not shown) covering its outer surface, into a substantially U-shape. Each of the electric conductor segments 50 has, at each free end thereof, an exposed portion (not shown) where the insulating coat is removed from the electric conductor segment 50. Corresponding pairs of the exposed portions of the electric conductor segments 50 are jointed together by welding to form a joint (or weld) 56 therebetween.

Figure 3:
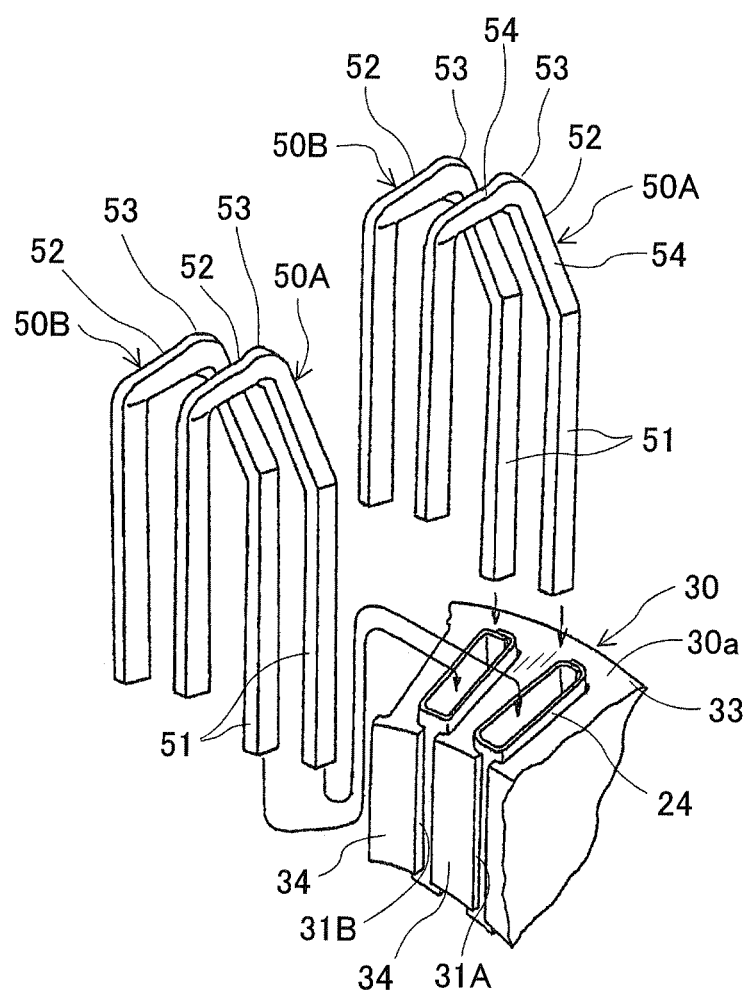
FIG. 3 is a schematic perspective view illustrating a process of inserting electric conductor segments for forming a stator coil of the stator into slots formed in a stator core of the stator.

More specifically, as shown in FIG. 3, each of the electric conductor segments 50 is substantially U-shaped to include a pair of straight portions 51 that extend parallel to each other and a turn portion 52 that connects ends of the straight portions 51 on the same side. The turn portion 52 includes an apex part 53 that is formed at the center of the turn portion 52 so as to extend parallel to a corresponding one of axial end faces 30a of the stator core 30. The turn portion 52 also includes a pair of oblique parts 54 that are formed respectively on opposite sides of the apex part 53 so as to extend obliquely at a predetermined angle with respect to the corresponding axial end face 30a of the stator core 30. In addition, in FIG. 3, the reference numeral 24 denotes an insulator that is arranged to electrically insulate the stator coil 40 (or the electric conductor segments 50) from the stator core 30.

Further, as shown in FIG. 3, in the present embodiment, the electric conductor segments 50 forming the stator coil 40 include a plurality of pairs of first and second electric conductor segments 50A and 50B. For each pair of the first and second electric conductor segments 50A and 50B, the straight portions 51 of the first electric conductor segment 50A are inserted in different ones of the slots 31 of the stator core 30 from those of the second electric conductor segment 50B. More specifically, the slots 31 in which the straight portions 51 of the first electric conductor segment 50A are inserted are respectively adjacent to those in which the straight portions 51 of the second electric conductor segment 50B are inserted.

For example, for that pair of the first and second electric conductor segments 50A and 50B which is shown on the right upper side in FIG. 3, the first electric conductor segment 50A has its right-side straight portion 51 inserted in the sixth layer (i.e., the radially outermost layer) of one slot 31A and its left-side straight portion 51 inserted in the fifth layer of another slot (not shown) that is positioned counterclockwise of the slot 31A by one magnetic pole pitch (i.e., a pitch between the N and S magnetic poles of the rotor 14). On the other hand, the second electric conductor segment 50B has its right-side straight portion 51 inserted in the sixth layer of one slot 31B that is positioned counterclockwise of and immediately adjacent to the slot 31A and its left-side straight portion 51 inserted in the fifth layer of another slot (not shown) that is positioned counterclockwise of the slot 31B by one magnetic pole pitch. That is, the first and second electric conductor segments 50A and 50B are circumferentially offset from each other by one slot pitch.

In addition, in each of the slots 31 of the stator core 30, there are inserted an even number of the straight portions 51 of the electric conductor segments 50. More specifically, in the present embodiment, in each of the slots 31 of the stator core 30, there are inserted six straight portions 51 of the electric conductor segments 50 so as to be radially stacked in six layers in the slot 31.

For each of the electric conductor segments 50, free end parts of the straight portions 51 of the electric conductor segment 50, which protrude outside of the corresponding slots 31 on the other axial side of the stator core 30, are twisted respectively toward opposite sides in the circumferential direction of the stator core 30 so as to extend obliquely at a predetermined angle with respect to the corresponding axial end face 30a of the stator core 30. Consequently, each of the free end parts of the straight portions 51 is transformed into an oblique part 55 that extends in the circumferential direction of the stator core 30 for substantially half a magnetic pole pitch (see FIG. 2).

Figure 4A:
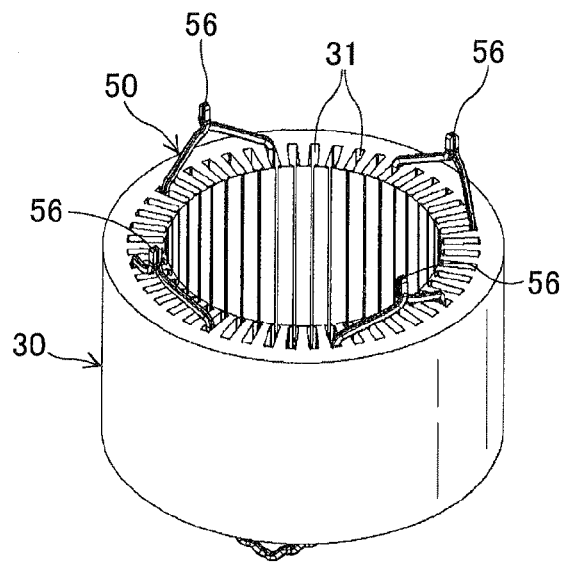
FIGS. 4A, 4B and 4C are respectively a perspective view, a top view and a circumferential development view, which together illustrate a manner in which each phase winding of the stator coil is wave-wound around the stator core.
Figure 4B:
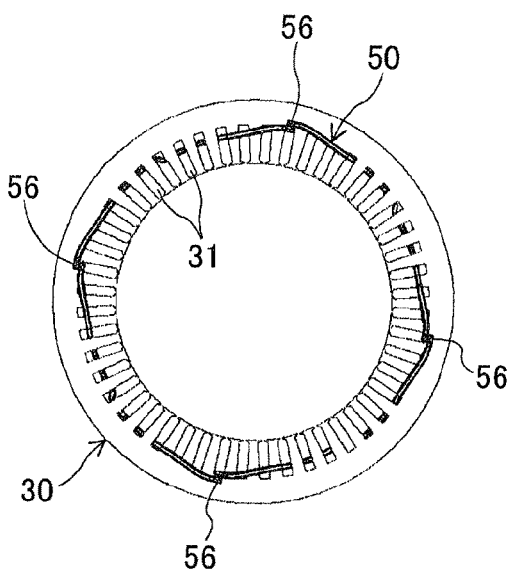
Figure 4C:
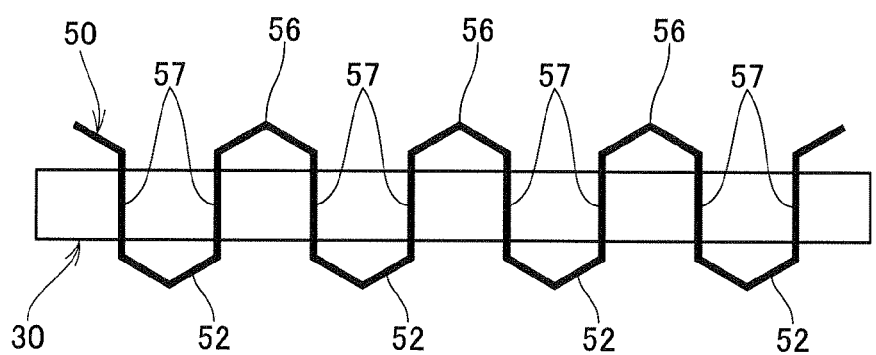

Further, on the other axial side of the stator core 30, each corresponding pair of the oblique parts 55 of the electric conductor segments 50 are welded at their respective distal ends, forming a weld 56 therebetween and thereby being electrically connected to each other. More specifically, for each of the three phase windings 41 (i.e., the U-phase, V-phase and W-phase windings) of the stator coil 40, all the electric conductor segments 50 which together make up the phase winding 41 are electrically connected in series with one another. As a result, as shown in FIGS. 4A-4C, each of the phase windings 41 is wave-wound around the stator core 30 by, for example, 6 turns in the circumferential direction of the stator core 30.

In addition, each of the phase windings 41 of the stator coil 40 further includes, in addition to the substantially U-shaped electric conductor segments 50 as shown in FIG. 3, other electric conductor segments of different shapes (not shown). Those other electric conductor segments include: an electric conductor segment that has a terminal of the phase winding 41 integrally formed therein; an electric conductor segment that has a neutral point lead (i.e., a lead for being connected to the neutral point of the stator coil 40); and electric conductor segments each having a connection portion for connecting two consecutive turns (e.g., the first and second turns) of the phase winding 41.

Figure 5A:
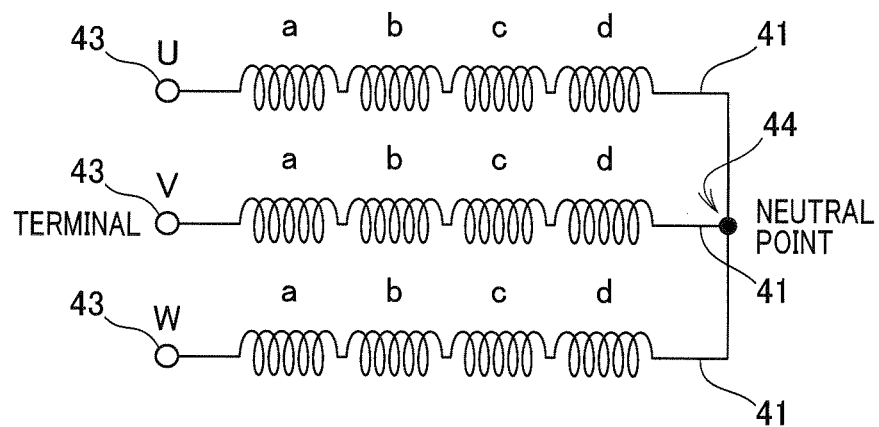
FIG. 5A is a connection diagram of the phase windings of the stator coil.

Referring further to FIG. 5A, in the present embodiment, the three phase windings 41 of the stator coil 40 are Y-connected to define the neutral point 44 therebetween. In other words, the U-phase, V-phase and W-phase windings 41 of the stator coil 40 are jointed and thus electrically connected to each other at the neutral point 44.

Moreover, each of the U-phase, V-phase and W-phase windings 41 of the stator coil 40 includes 2n sections, where n is a natural number greater than or equal to 2.

More specifically, in the present embodiment, each of the phase windings 41 of the stator coil 40 includes a first section (a), a second section (b), a third section (c) and a fourth section (d), which are sequentially arranged from the terminal 43 of the phase winding 41 at one end of the phase winding 41 to the neutral point 44 of the stator coil 40 at the other end of the phase winding 41. That is, in the present embodiment, n is equal to 2. Further, each of the first to the fourth sections (a)-(d) is wave-wound on the stator core 30.

Furthermore, for each of the phase windings 41, the first section is received in different ones of the single-phase slots 31 for the phase winding 41 from the 2nth section. Moreover, counting from the terminal 43 side, the 2mth section is received in the same ones of the single-phase slots 31 for the phase winding 41 as the (2m−1)th section, where m is a natural number that satisfies 1≤m≤n.

Figure 5B:
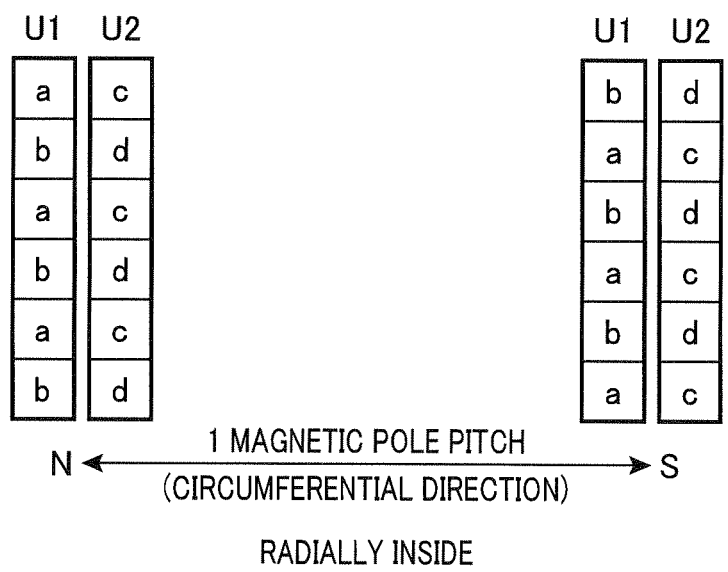
FIG. 5B is a schematic view illustrating the positions of first to fourth sections (a)-(d) of a U-phase winding of the stator coil in single-phase slots U1 and U2 of the stator core.

More specifically, in the present embodiment, as shown in FIG. 5B, for the U-phase winding 41, the first section (a) is received in the single-phase slots U1, while the fourth section (d) (i.e., the 2nth section) is received in the single-phase slots U2. Here, the single-phase slots U1 are circumferentially spaced from one another by one magnetic pole pitch; the single-phase slots U2 are also circumferentially spaced from one another by one magnetic pole pitch; each of the single-phase slots U1 is positioned immediately adjacent to one of the single-phase slots U2. Further, since n is equal to 2, m is equal to 1 or 2. Therefore, the second section (b) (i.e., the 2mth section where m is equal to 1) is received in the same single-phase slots U1 as the first section (a) (i.e., the (2m−1)th section where m is equal to 1). On the other hand, the fourth section (d) (i.e., the 2mth section where m is equal to 2) is received in the same single-phase slots U2 as the third section (c) (i.e., the (2m−1)th section where m is equal to 2). In addition, it should be noted that though not graphically shown, the V-phase and W-phase windings 41 of the stator coil 40 are wound on the stator core 30 in the same manner as the U-phase winding 41.

Moreover, in the present embodiment, on the one axial side (i.e., the lower side in FIG. 2) of the stator core 30, all the turn portions 52 of the electric conductor segments 50, which protrude from one axial end face 30a of the stator core 30, together make up a first coil end 47 of the stator coil 40. On the other axial side (i.e., the upper side in FIG. 2) of the stator core 30, all of the oblique parts 55 of the electric conductor segments 50, which protrude from the other axial end face 30a of the stator core 30, and the joints 56 formed between the oblique parts 55 together make up a second coil end 48 of the stator coil 40.

In addition, though not graphically shown, on the one axial side of the stator core 30, the turn portions 52 of the electric conductor segments 50 are radially arranged in a given number of layers. On the other axial side of the stator core 30, as shown in FIG. 2, the joints 56 formed between the oblique parts 55 of the electric conductor segments 50 are circumferentially arranged at given intervals and radially arranged in a given number of layers.

Figure 6:
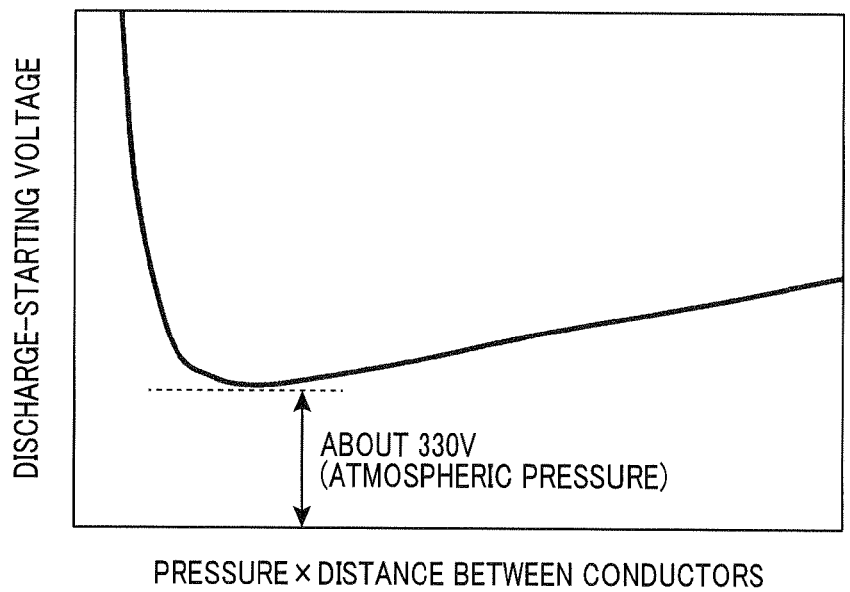
FIG. 6 is a graphical representation illustrating the relationship according to Paschen's Law between discharge-starting voltage, pressure and the distance between electric conductors.

Furthermore, in the present embodiment, the maximum voltage applied between the terminals 43 of the U-phase, V-phase and W-phase windings 41 of the stator coil 40 is set, based on Paschen's Law, to be higher than or equal to 330V. In addition, as shown in FIG. 6, according to Paschen's Law, electric discharge may occur between electric conductors at the atmospheric pressure when the voltage across the electric conductors is not lower than about 330 V.

The above-described electric rotating machine 1 according to the present embodiment has the following advantages.

In the present embodiment, the electric rotating machine 1 includes the rotor core 14 and the stator 20. The rotor 14 has four pairs of N and S magnetic poles that are arranged at a predetermined pitch in the circumferential direction of the rotor 14 (see, FIG. 5B). The stator 20 includes the stator core 30 and the stator coil 40. The stator core 30 has the 48 slots 31, which are arranged in the circumferential direction of the stator core 30, and is radially opposed to the rotor 14. The stator coil 40 is comprised of the U-phase, V-phase and W-phase windings 41 each of which is wave-wound on the stator core 30 so as to be inserted in the corresponding slots 31 of the stator core 30. More specifically, the stator core 30 has, for each of the phase windings 41 of the stator coil 40, n circumferentially-consecutive single-phase slots 31, in which only the phase winding 41 is received, per magnetic pole of the rotor 14, where n is a natural number not less than 2 (e.g., n=2 in the present embodiment). Each of the phase windings 41 of the stator coil 40 includes 2n sections (i.e., four sections in the present embodiment) that are sequentially arranged from the terminal 43 of the phase winding 41 to the neutral point 44 of the stator coil 40. For each of the phase windings 41, the first section (a) is received in different ones of the single-phase slots 31 for the phase winding 41 from the 2nth section (i.e., the fourth section (d) in the present embodiment).

Figure 7:
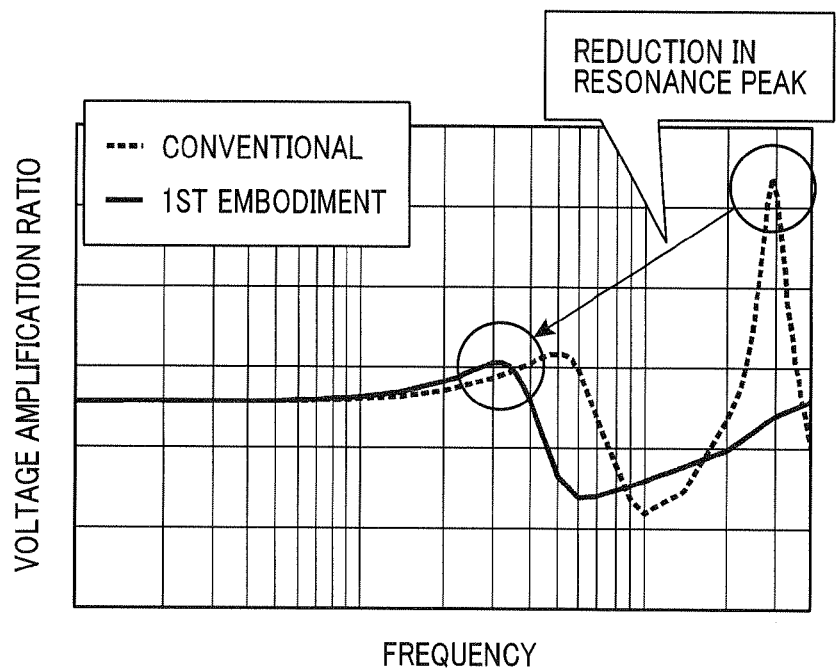
FIG. 7 is a graphical representation giving a comparison in resonant frequency and resonance peak between the stator according to the first embodiment and a stator with a conventional configuration.

With the above configuration, the negative mutual inductance between the first and the 2nth sections can be minimized, thereby minimizing the decrease in the total inductance of the stator coil 40 due to the negative mutual inductance. Consequently, as shown in FIG. 7, it is possible to considerably lower both the resonant frequency and the resonance peak of the stator coil 40 in comparison with the conventional configuration shown in FIG. 27A. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

In addition, the resonant frequency $f_n$ of the stator coil 40 can be determined by the following equation:

$$f_n 1/2\pi\sqrt{LC}$$

where L is the total inductance of the stator coil 40 and C is the earth capacitance between the stator coil 40 and the stator core 30. Moreover, the total inductance L of the stator coil 40 is the sum of the self-inductance of the stator coil 40 and the mutual inductances between different sections of the stator coil 40. Therefore, by minimizing the negative mutual inductance between the first and the 2nth sections in each phase winding 41 of the stator coil 40, it is possible to minimize the decrease in the total inductance L of the stator coil 40 due to the negative mutual inductance.

In the present embodiment, for each of the phase windings 41 of the stator coil 40, the 2mth section of the phase winding 41 is received in the same single-phase slots 31 for the phase winding 41 as the (2m−1)th section of the phase winding 41, where m is a natural number that satisfies 1≤m≤n. For example, for the U-phase winding 41, the first and second sections (a) and (b) are received in the same single-phase slots U1, while the third and fourth sections (c) and (d) are received in the same single-phase slots U2.

Consequently, it is possible to minimize the negative mutual inductances between the first and third sections (a) and (c) and between the second and fourth sections (b) and (d), thereby further lowering both the resonant frequency and the resonance peak of the stator coil 40. As a result, it is possible to further lower the maximum phase-to-phase voltage of the stator coil 40, thereby further shortening the necessary phase-to-phase clearance of the stator coil 40 for ensuring electrical insulation between the phase windings 41.

In the present embodiment, for each of the phase windings 41 of the stator coil 40, each of the first to the 2nth sections of the phase winding 41 is wave-wound on the stator core 30.

With the above configuration, it is possible to easily form the stator coil 40. Moreover, it is also possible to reliably obtain the effect of lowering both the resonant frequency and the resonance peak of the stator coil 40.

In the present embodiment, each of the phase windings 41 of the stator coil 40 is formed of the substantially U-shaped electric conductor segments 50 that are respectively inserted in the corresponding single-phase slots 31 for the phase winding 41 and electrically connected in series with one another. On one axial side of the stator core 30, each corresponding pair of the in-slot portions 51 of the electric conductor segments 50 are connected by one turn portion 52. On the other axial side of the stator core 30, each corresponding pair of the oblique parts 55 of the electric conductor segments 50 are joined together to form the joint 56 therebetween. All of the turn portions 52 connecting the in-slot portions 51 of the electric conductor segments 50 of the phase windings 41 together make up the first coil end 47 of the stator coil 40 on the one axial side of the stator core 30. All of the oblique parts 55 of the electric conductor segments 50 of the phase windings 41 and the joints 56 formed between the oblique parts 55 together make up the second coil end 48 of the stator coil 40 on the other axial side of the stator core 30.

With the above configuration, since each of the electric conductor segments 50 can be made short and thus be easily handled, it is possible to more easily manufacture the stator coil 40 in comparison with the case of forming each of the phase windings 41 of the stator coil 40 with a single continuous electric wire.

In the present embodiment, the maximum voltage applied between the terminals 43 of the phase windings 41 of the stator coil 40 is set to be higher than or equal to 330 V.

Specifically, as shown in FIG. 6, according to Paschen's Law, in the region where the discharge-starting voltage is not lower than about 330 V, the discharge-starting voltage has a positive correlation with the distance between the electric conductors. Accordingly, in the region, the necessary phase-to-phase clearance of the stator coil 40 for ensuring electrical insulation between the phase windings 41 also has a positive correlation with the maximum phase-to-phase voltage of the stator coil 40. Therefore, setting the maximum voltage applied between the terminals 43 of the phase windings 41 as above, it is possible to shorten the necessary phase-to-phase clearance of the stator coil 40 by lowering the maximum phase-to-phase voltage of the stator coil 40.

Experiment 1

This experiment has been conducted to verify the effect of lowering the maximum phase-to-phase voltage of the stator coil 40 according to the first embodiment.

Specifically, in the experiment, an electric rotating machine was used in which: the stator core had two single-phase slots per phase winding of the stator coil and per magnetic pole of the rotor; and the phase windings of the stator coil were wave-wound on the stator core so as to be radially stacked in six layers in each slot of the stator core. Moreover, with the electric rotating machine, three different stator configurations were realized by changing the sequence of electrically connecting different sections of the phase windings of the stator coil.

Figure 27A:
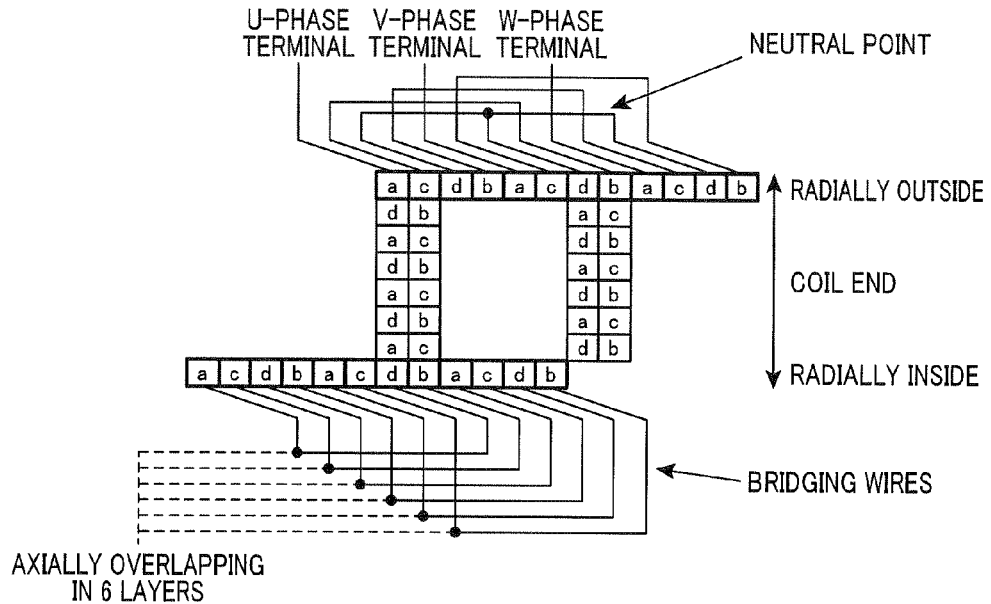
FIGS. 27A-27B and 28A-28C are schematic views respectively illustrating various stator configurations investigated by the inventors of the present invention.
Figure 27B:
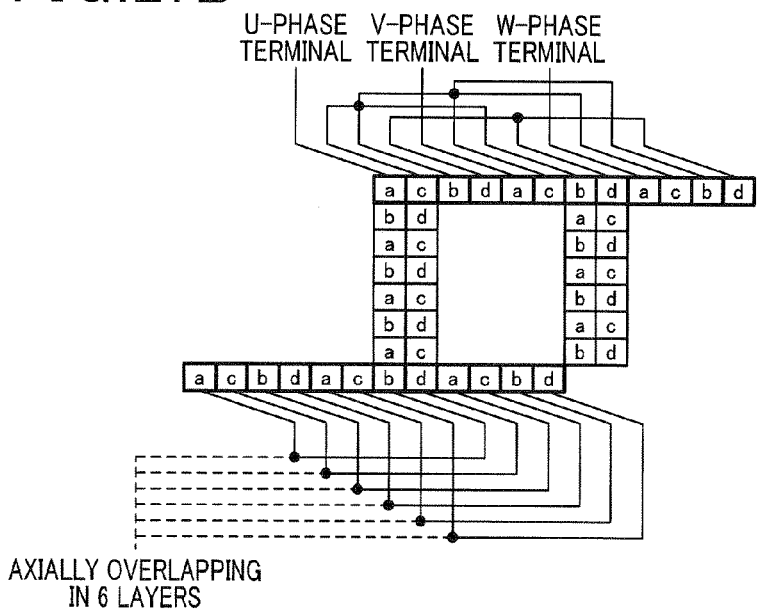
Figure 28A:
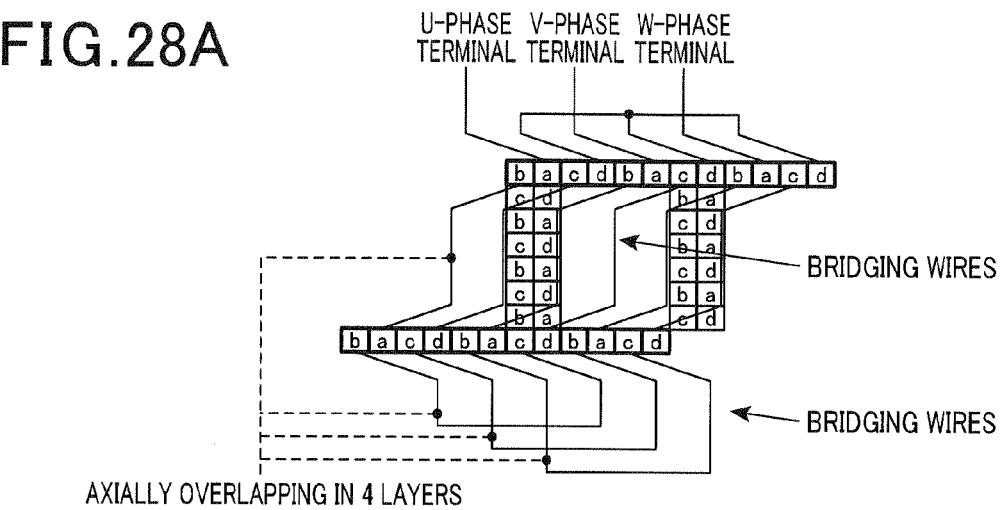
Figure 28B:
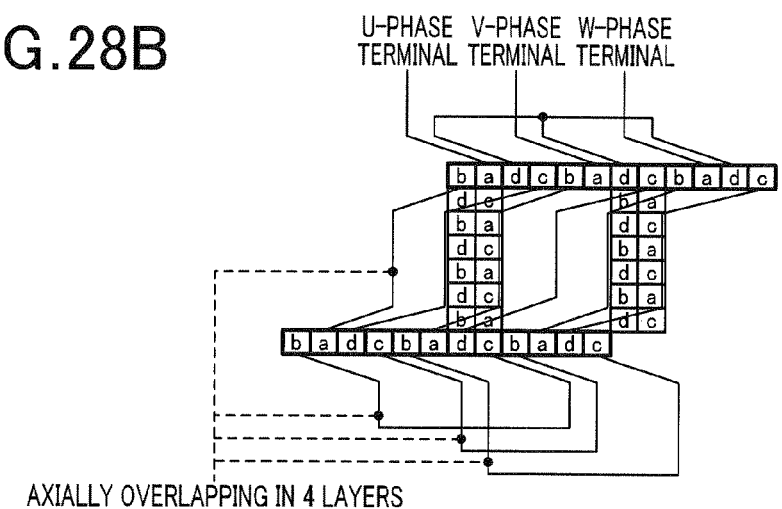
Figure 28C:
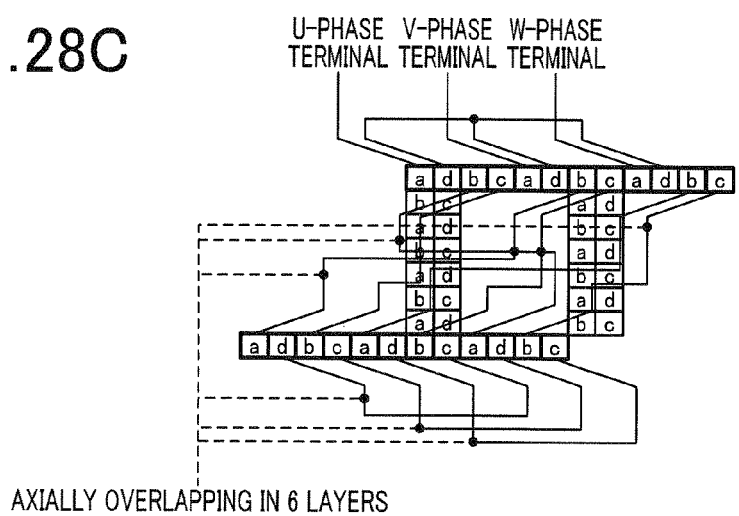
Figure 29:
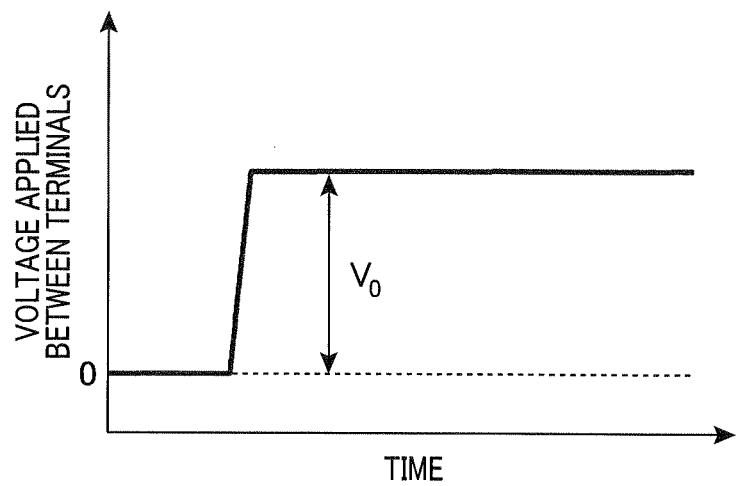
FIG. 29 is a waveform chart of a voltage applied between terminals of phase windings of a stator coil in a conventional electric rotating machine.
Figure 30:
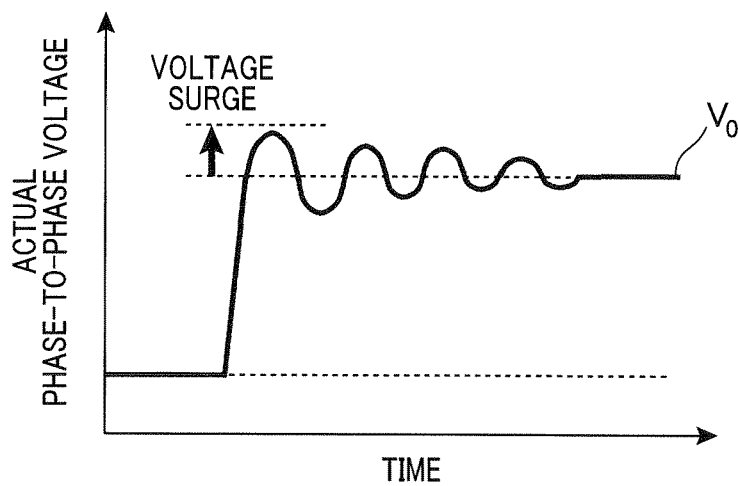
FIG. 30 is a waveform chart of the actual phase-to-phase voltage of the stator coil when the voltage as shown
Figure 31:
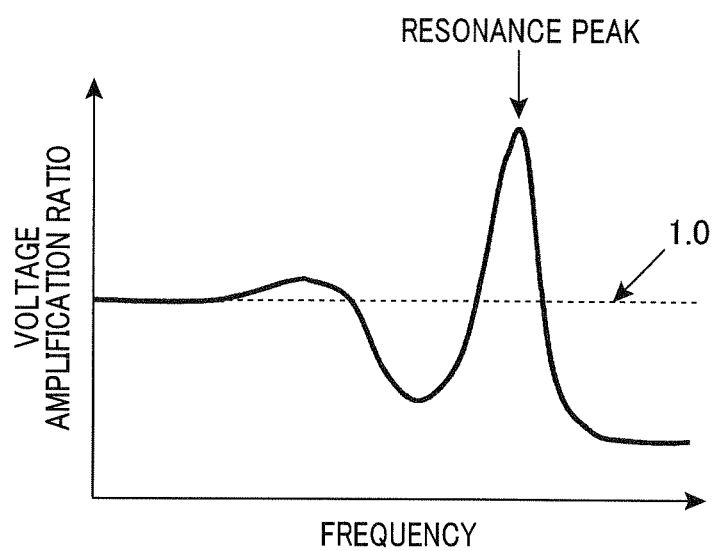
FIG. 31 is a graphical representation illustrating the change in voltage amplification ratio of the stator coil with frequency in the conventional electric rotating machine.

The first configuration was the conventional one as shown in FIG. 27A. The second configuration was the conventional one as shown in FIG. 28A. In both the first and second conventional configurations, for each phase winding of the stator coil, the first section (a) and the fourth section (d) are received in the same single-phase slots as disclosed in Patent Document 1. On the other hand, the third configuration was the one according to the first embodiment and as shown in FIG. 8B.

Figures 8A, 8B:
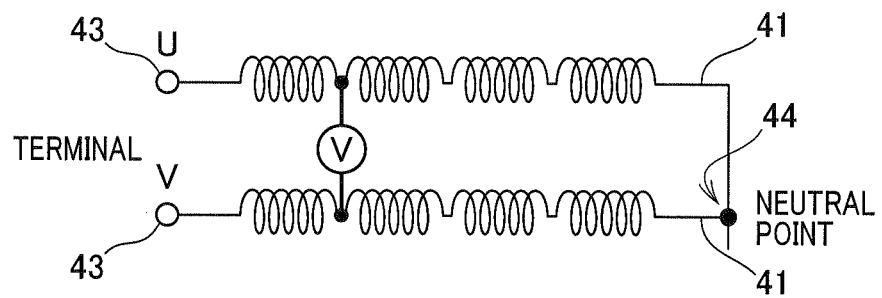
FIG. 8A is a schematic view illustrating the measurement positions of the phase-to-phase voltage of the stator coil in Experiment 1.
FIG. 8B is a schematic view illustrating the configuration of the stator according to the first embodiment which was tested in Experiment 1.

With each of the three configurations, as shown in FIG. 8A, the phase-to-phase voltage was measured between the phase windings 41 at positions where the degree of resonance is high (e.g., at about the ¼-length positions from the respective terminals 43 in the phase windings 41).

Figure 9:
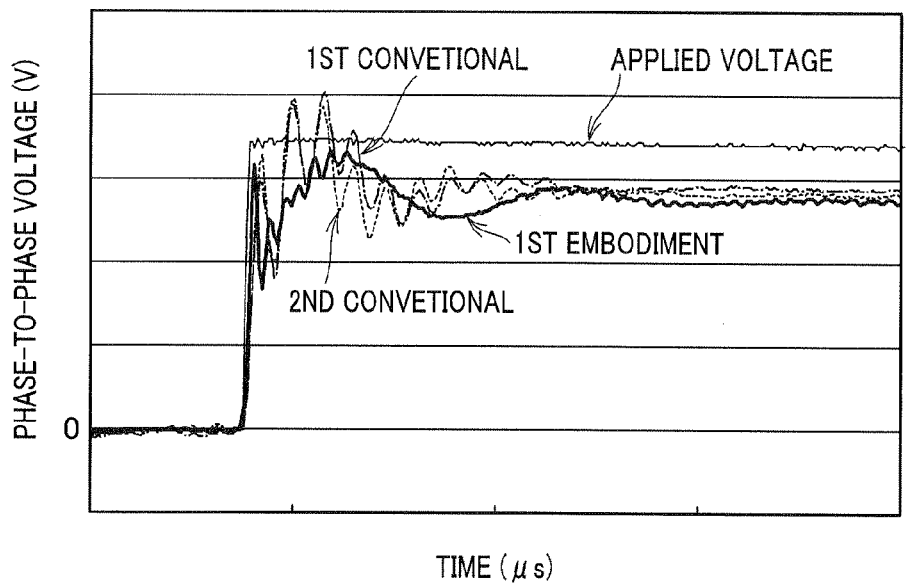
FIG. 9 is a graphical representation showing the measurement results of Experiment 1.

The measurement results of the experiment are shown in FIG. 9, in which the horizontal axis represents time and the vertical axis represents the phase-to-phase voltage. In addition, in FIG. 9, "APPLIED VOLTAGE" denotes the voltage applied between the terminals 43 of the phase windings 41; "1ST CONVENTIONAL" denotes the first conventional configuration; "1ST EMBODIMENT" denotes the configuration according to the first embodiment; and "2ND CONVENTIONAL" denotes the second conventional configuration.

As seen from FIG. 9, with the configuration according to the first embodiment, the fluctuation in the phase-to-phase voltage due to resonance was considerably reduced in comparison with the first and second conventional configurations. Moreover, with the configuration according to the first embodiment, the maximum phase-to-phase voltage was reduced by about 18% with respect to the voltage applied between the terminals 43 of the phase windings 41. In comparison, with the first and second conventional configurations, the maximum phase-to-phase voltage exceeded the voltage applied between the terminals 43 of the phase windings 41.

[First Modification]

Figure 10A:
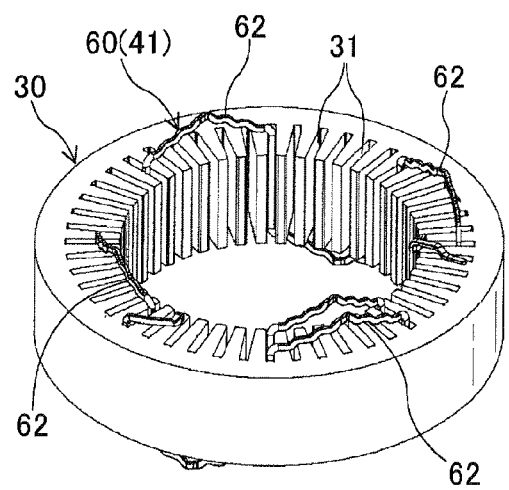
FIGS. 10A and 10B are respectively a perspective view and a top view which together illustrate a first modification of the configuration of the stator according to the first embodiment.
Figure 10B:
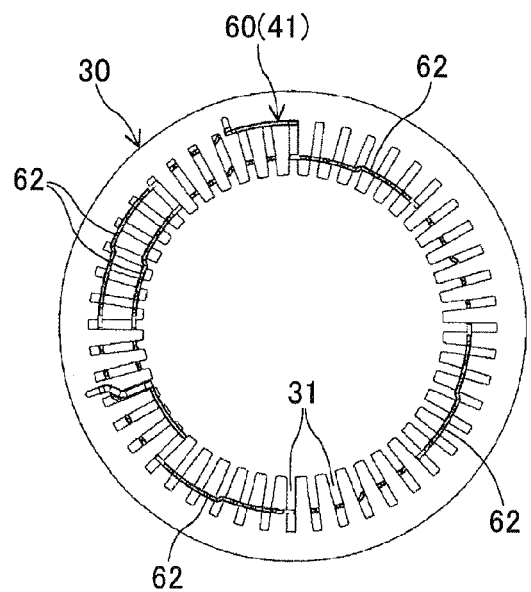

In this modification, as shown in FIGS. 10A and 10B, each of the phase windings 41 of the stator coil 40 is formed by joining eight continuous electric wires 60, not by joining the electric conductor segments 50 as in the first embodiment.

Specifically, each of the electric wires 60 includes twelve in-slot portions (not shown), each of which is received in a corresponding one of the slots 31 of the stator core 30, and eleven turn portions 62 that each connect a corresponding adjacent pair of the in-slot portions and are alternately located on opposite axial sides of the stator core 30. Further, among the twelve in-slot portions, the first in-slot portion which is formed at one end of the electric wire 60 is received in the first layer (i.e., the radially innermost layer) of one slot 31 of the stator core 30, while the twelfth in-slot portion which is formed at the other end of the electric wire 60 is received in the sixth layer (i.e., the radially outermost layer) of another slot 31 of the stator core 30. Each of the electric wires 60 is wave-wound around the stator core 30 by, for example, 11/8 turns.

Moreover, in the modification, each of the phase windings 41 of the stator coil 40 includes, as in the first embodiment, four sections (i.e., 2n sections where n is equal to 2). The first to the fourth sections (a)-(d) are sequentially arranged from one end of the phase winding 41 to the other end of the phase winding 41. The first section (a) is received in different ones of the single-phase slots 31 for the phase winding 41 from the fourth section (d). Further, the first and second sections (a) and (b) are received in the same ones of the single-phase slots 31 for the phase winding 41, while the third and fourth sections (c) and (d) are received in the same ones of the single-phase slots 31 for the phase winding 41. Furthermore, each of the first to the fourth sections (a)-(d) is wave-wound on the stator core 30.

With the above configuration according to the modification, it is also possible to considerably lower both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

[Second Modification]

Figure 11A:
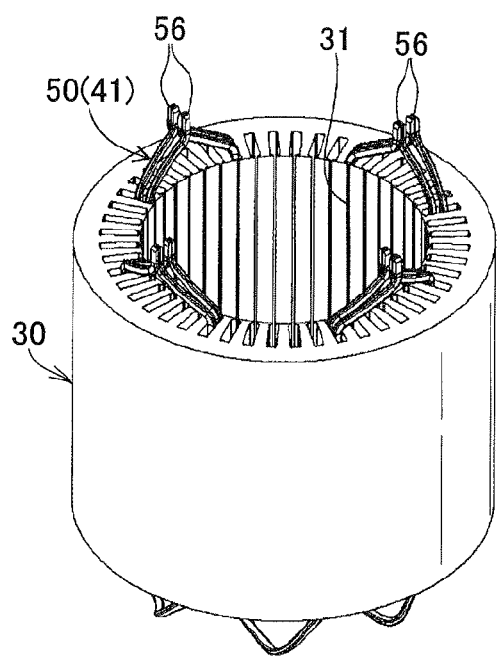
FIGS. 11A, 11B and 11C are respectively a perspective view, a top view and a circumferential development view, which together illustrate a second modification of the configuration of the stator according to the first embodiment.
Figure 11B:
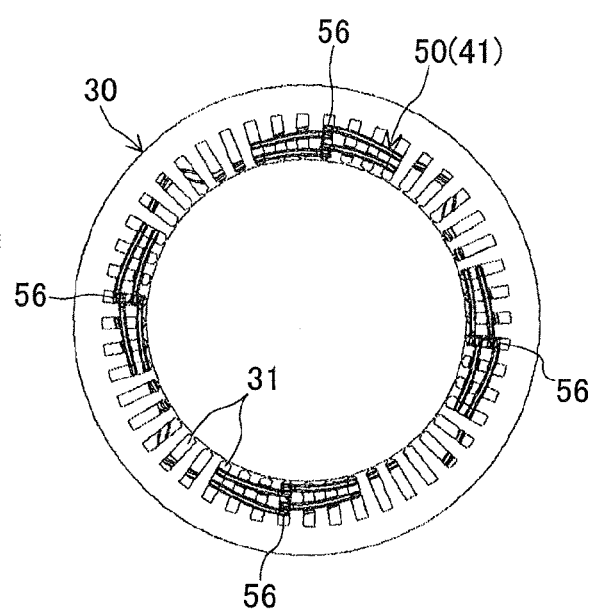
Figure 11C:
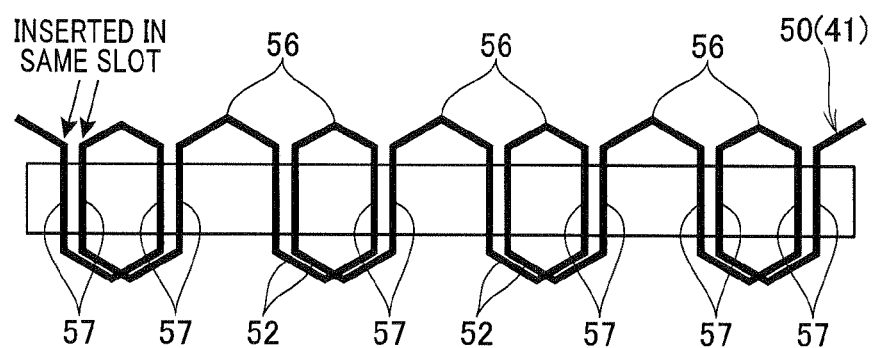

In this modification, as shown in FIGS. 11A-11C, each of the phase windings 41 of the stator coil 40 is formed by joining a plurality of substantially U-shaped electric conductor segments 50 as in the first embodiment. However, each of the phase windings 41 is lap-wound on the stator core 30, not wave-wound on the stator core 30 as in the first embodiment.

Specifically, in the modification, each of the phase windings 41 is lap-wound around the stator core 30 to have a plurality of in-slot portion pairs each of which is received in a corresponding one of the single-phase slots 31 for the phase winding 41 such that the two in-slot portions of the pair are superposed in the corresponding single-phase slot 31.

Moreover, in the modification, each of the phase windings 41 of the stator coil 40 includes, as in the first embodiment, four sections (i.e., 2n sections where n is equal to 2). The first to the fourth sections (a)-(d) are sequentially arranged from one end of the phase winding 41 to the other end of the phase winding 41. The first section (a) is received in different ones of the single-phase slots 31 for the phase winding 41 from the fourth section (d). Further, the first and second sections (a) and (b) are received in the same ones of the single-phase slots 31 for the phase winding 41, while the third and fourth sections (c) and (d) are received in the same ones of the single-phase slots 31 for the phase winding 41.

With the above configuration according to the modification, it is also possible to considerably lower both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

Second Embodiment

This embodiment illustrates a stator 20 which has a similar configuration to the stator 20 according to the first embodiment; accordingly, only the differences therebetween will be described hereinafter.

Figure 12:
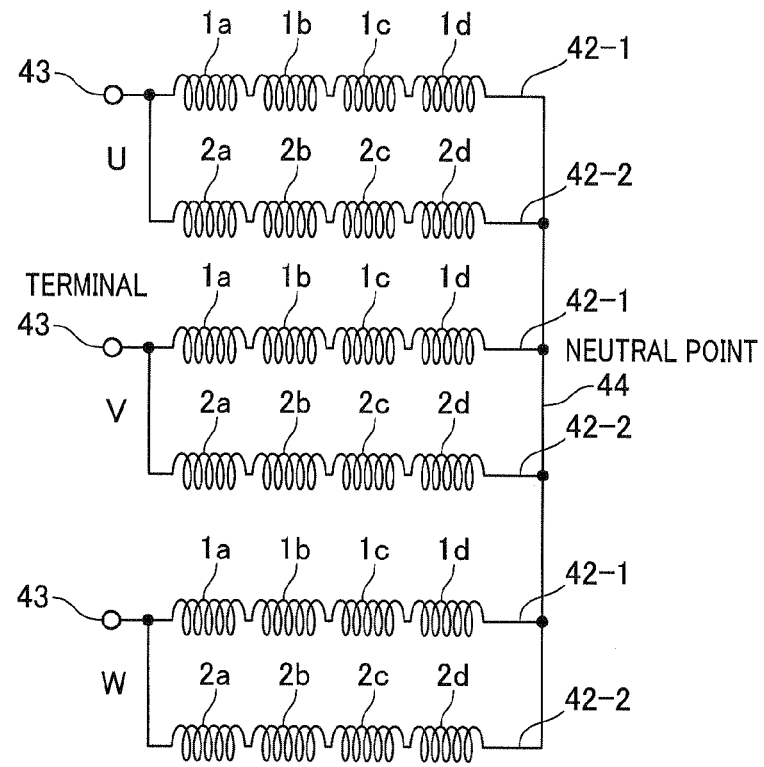
FIG. 12 is a connection diagram of phase windings of a stator coil of a stator according to a second embodiment.

In the present embodiment, as shown in FIG. 12, each of the phase windings 41 of the stator coil 40 is comprised of j sub-windings 42 that are connected in parallel with each other between the terminal 43 of the phase winding 41 and the neutral portion 44 of the stator coil 40, where j is a natural number greater than or equal to 2. Moreover, each of the sub-windings 42 includes k sections that are sequentially arranged from one end of the sub-winding 42 on the terminal 43 side to the other end of the sub-winding 42 on the neutral point 44 side, where k is a natural number greater than or equal to 2. Furthermore, for each of the sub-windings 42, the first to the (k/2)th sections of the sub-winding 42 are received in different ones of the single-phase slots 31 for the phase winding 41 from the (k/2+1)th to the kth sections of the sub-winding 42.

Specifically, assume that j is equal to 2 and k is equal to 4. Then, as shown in FIG. 12, each of the phase windings 41 of the stator coil 40 is comprised of a first sub-winding 42-1 and a second sub-winding 42-2 that are connected in parallel with each other between the terminal 43 of the phase winding 41 and the neutral point 44 of the stator coil 40. The first sub-winding 42-1 includes a first section (1*a*), a second section (1*b*), a third section (1*c*) and a fourth section (1*d*), which are sequentially arranged from one end of the first sub-winding 42-1 on the terminal 43 side to the other end of the first sub-winding 42-1 on the neutral point 44 side. The second sub-winding 42-2 includes a first section (2*a*), a second section (2*b*), a third section (2*c*) and a fourth section (2*d*), which are sequentially arranged from one end of the second sub-winding 42-2 on the terminal 43 side to the other end of the second sub-winding 42-2 on the neutral point 44 side.

Figure 13:
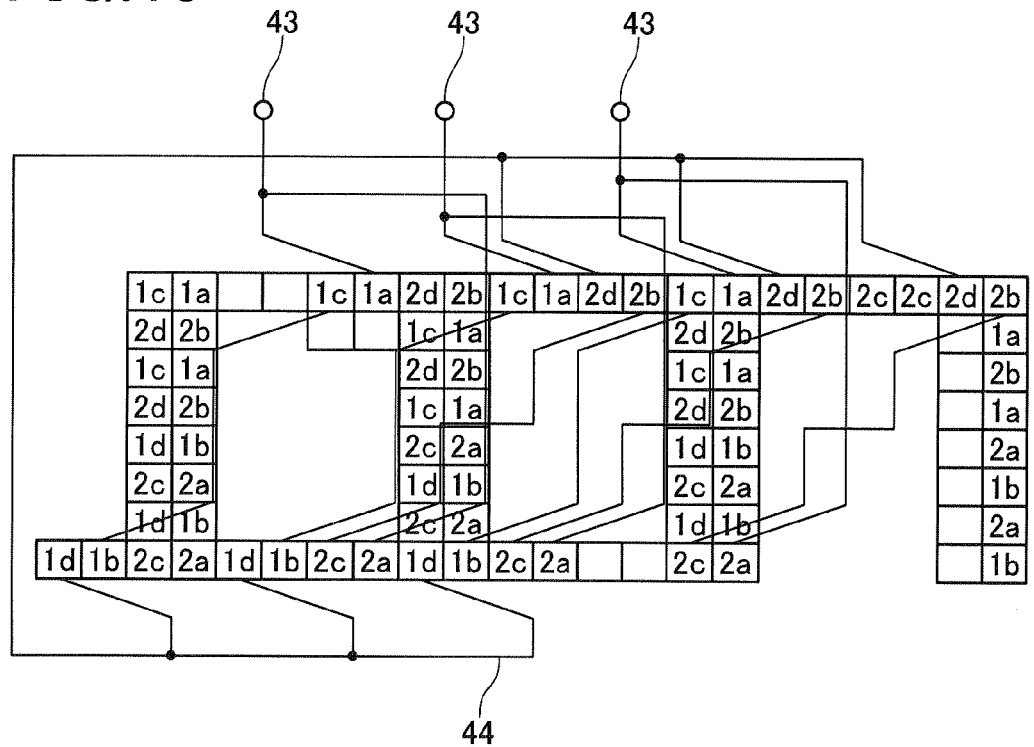
FIG. 13 is a schematic view illustrating the positions of sections of sub-windings of each phase winding of the stator coil in corresponding single-phase slots of a stator core of the stator according to the second embodiment.

Moreover, as shown in FIG. 13, for each of the phase windings 41, the first and second sections (1*a*, 1*b*, 2*a*, 2*b*) of the first and second sub-windings 42-1 and 42-2 are received in different ones of the single-phase slots 31 for the phase winding 41 from the third and fourth sections (1*c*, 1*d*, 2*c*, 2*d*) of the first and second sub-windings 42-1 and 42-2.

In addition, it should be noted that for the sake of simplicity, only the positions of the sections of the sub-windings of the U-phase winding 41 in the single-phase slots 31 for the U-phase winding 41 are shown in FIG. 13; and that the sections of the sub-windings of the V-phase and W-phase windings 41 are respectively positioned in the single-phase slots 31 for the V-phase and W-phase windings 41 in the same manner as those of the U-phase winding 41.

With the above configuration of the stator 20 according to the present embodiment, for each phase winding 41 of the stator coil 40, it is possible to weaken the magnetic coupling between the first and second sections (1*a*, 1*b*, 2*a*, 2*b*) and the third and fourth sections (1*c*, 1*d*, 2*c*, 2*d*) of the first and second sub-windings 42-1 and 42-2 of the phase winding 41, thereby minimizing the negative mutual inductances therebetween. Consequently, it is possible to minimize the decrease in the total inductance of the stator coil 40 due to the negative mutual inductances, thereby lowering both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

In addition, in the case of k being an odd number greater than 2, for each of the sub-windings 42-1 and 42-2, the central section of the sub-winding may be received either in the same single-phase slots 31 as those sections of the sub-winding which are positioned upstream (i.e., on the terminal 43 side) of the central section or in the same single-phase slots 31 as those sections of the sub-winding which are positioned downstream (i.e., on the neutral point 44 side) of the central section.

Third Embodiment

This embodiment illustrates a stator 20 which has a similar configuration to the stator 20 according to the first embodiment; accordingly, only the differences therebetween will be described hereinafter.

Figure 14:
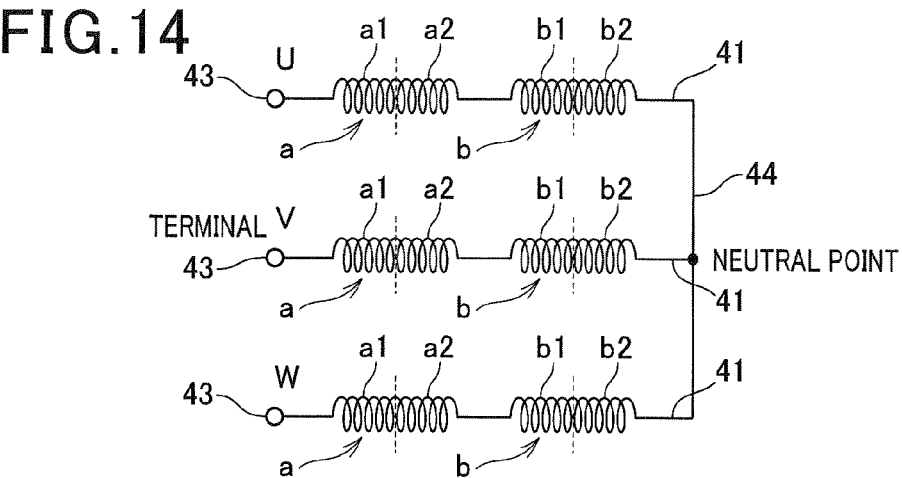
FIG. 14 is a connection diagram of phase windings of a stator coil of a stator according to a third embodiment.
Figure 15:
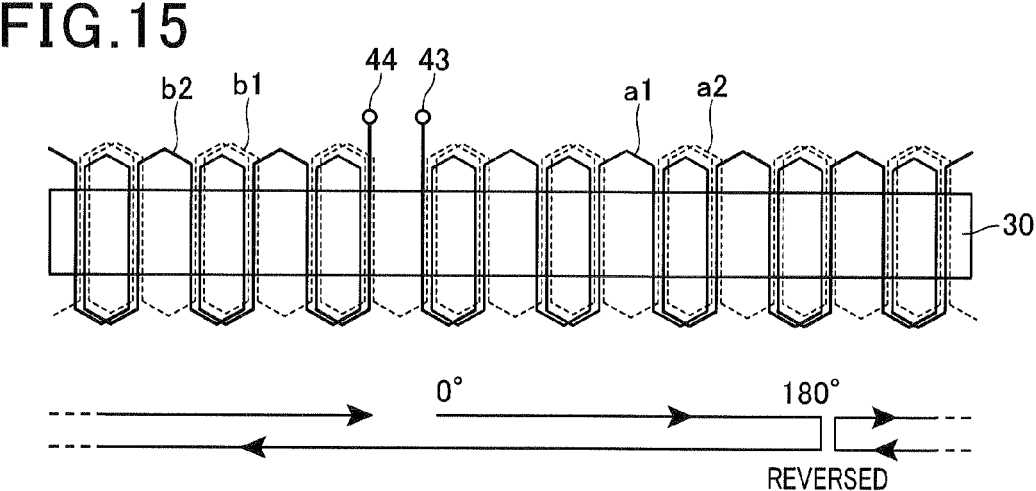
FIG. 15 is a circumferential development view illustrating a manner in which each phase winding of the stator coil is wound around a stator core of the stator according to the third embodiment.

In this embodiment, as shown in FIGS. 14 and 15, each of the phase windings 41 of the stator coil 40 includes k sections that are sequentially arranged from one end of the phase winding 41 on the terminal 43 side to the other end of the phase winding 41 on the neutral point 41 side, where k is a natural number greater than or equal to 2. Moreover, each of the k sections is wound on the stator core 30 in such as a manner that the circumferential advancing direction of the section is reversed for each completion of a circumferential advancement of 360°/k (i.e., an advancement in the circumferential direction of the stator core 30 corresponding to a mechanical angular range of 360°/k).

Specifically, assume that k=2. Then, as shown in FIG. 14, each of the phase windings 41 of the stator coil 40 includes a first section (a) on the terminal 43 side and a second section (b) on the neutral point 44 side. Moreover, each of the first and second sections (a) and (b) is wound on the stator core 30 in such a manner that the circumferential advancing direction of the section is reversed each time the section completes an advancement in the circumferential direction of the stator core 30 by 180°.

More specifically, as shown in FIG. 15, for each of the phase windings 41, the first section (a) of the phase winding 41 is first two-layer-lap-wound on the stator core 30 so as to advance clockwise (i.e., rightward in FIG. 15) in the circumferential direction of the stator core 30 from a first slot 31 (not shown) to a second slot 31 (not shown) of the stator core 30. The first slot 31 has a circumferential position corresponding to a mechanical angle of 0° (or 360°), while the second slot 31 has a circumferential position corresponding to a mechanical angle of 180°. That is, the first section (a) is first advanced clockwise in the circumferential direction of the stator core 30 by 180°. Consequently, as indicated with a solid line in FIG. 15, a first part (a1) of the first section (a) is received in two layers in each of those slots 31 the circumferential positions of which fall in the range of 0 to 180°. Then, the first section (a) is two-layer-lap-wound on the stator core 30 so as to advance counterclockwise (i.e., leftward in FIG. 15) from the second slot 31 to the first slot 31. That is, the circumferential advancing direction of the first section (a) is reversed at the second slot 31 and the first section (a) is further advanced counterclockwise in the circumferential direction of the stator core 30 by 180°. Consequently, as indicated with a dashed line in FIG. 15, a second part (a2) of the first section (a) is also received in two layers in each of those slots 31 the circumferential positions of which fall in the range of 0 to 180°.

Moreover, the second section (b) of the phase winding 41 is first two-layer-lap-wound on the stator core 30 so as to advance counterclockwise from the first slot 31 to the second slot 31. That is, the second section (b) is first advanced counterclockwise in the circumferential direction of the stator core 30 by 180°. Consequently, as indicated with a dashed line in FIG. 15, a first part (b1) of the second section (b) is received in two layers in each of those slots 31 the circumferential positions of which fall in the range of 180 to 360°. Then, the second section (b) is two-layer-lap-wound on the stator core 30 so as to advance clockwise from the second slot 31 to the first slot 31. That is, the circumferential advancing direction of the second section (b) is reversed at the second slot 31 and the second section (b) is further advanced clockwise in the circumferential direction of the stator core 30 by 180°. Consequently, as indicated with a solid line in FIG. 15, a second part (b2) of the second section (b) is also received in two layers in each of those slots 31 the circumferential positions of which fall in the range of 180 to 360°.

In addition, in the present embodiment, for each of the first and second sections (a) and (b) of the phase windings (41), the circumferential advancing direction of the section is reversed only once and thus the section includes only the first and second parts. However, it should be noted that the circumferential advancing direction of the section may also be reversed a plurality of times and thus the section may include three or more parts.

With the above configuration of the stator 20 according to the present embodiment, for each of the phase windings 41 of the stator coil 40, the first section (a) of the phase winding 41 can be separately received in different ones of the single-phase slots 31 for the phase winding 41 from the second section (b) of the phase winding 41. Consequently, it is possible to weaken the magnetic coupling between the first section (a) and the second section (b) of the phase winding 41, thereby minimizing the negative mutual inductance therebetween. Thus, it is possible to minimize the decrease in the total inductance of the stator coil 40 due to the negative mutual inductance, thereby lowering both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

Comparative Example of Third Embodiment

In this comparative example, for each of the phase windings 41 of the stator coil 40, each of the k sections of the phase winding 41 is wound on the stator core 30 in a different manner from the third embodiment.

Figure 16:
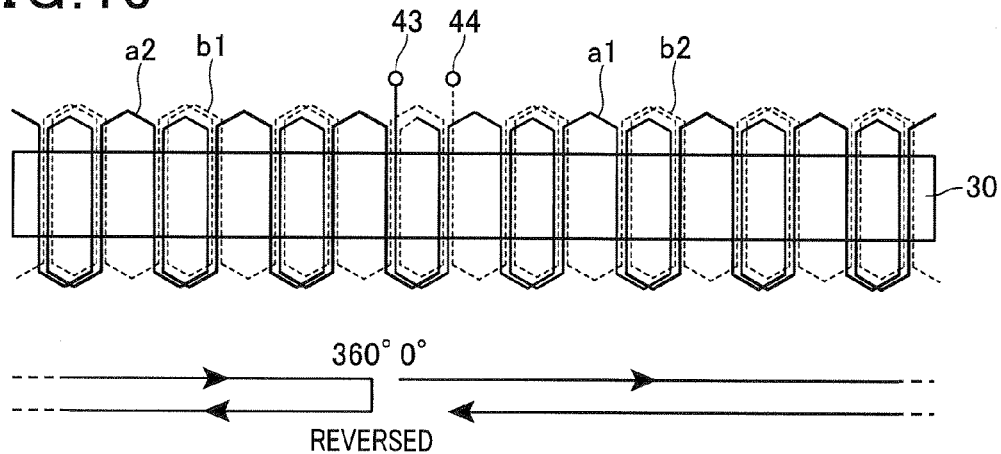
FIG. 16 is a circumferential development view illustrating a manner in which each phase winding of the stator coil is wound around the stator core according to a comparative example of the third embodiment.

Specifically, as shown in FIG. 16, for each of the phase windings 41, the first section (a) of the phase winding 41 is first two-layer-lap-wound on the stator core 30 by one complete turn so as to advance clockwise (i.e., rightward in FIG. 6) in the circumferential direction of the stator core 30 by 360°. That is, the first section (a) is wound on the stator core 30 without reversing its circumferential advancing direction. Then, the second section (b) of the phase winding 41 is two-layer-lap-wound on the stator core 30 by one complete turn so as to advance counterclockwise (i.e., leftward in FIG. 16) in the circumferential direction of the stator core 30 by 360°. That is, the second section (b) is also wound on the stator core 30 without reversing its circumferential advancing direction.

Consequently, as indicated with a solid line in FIG. 16, the first section (a) is received in two layers in each of those slots 31 the circumferential positions of which fall in the range of 0 to 360°. Moreover, as indicated with a dashed line in FIG. 16, the second section (b) is also received in two layers in each of those slots 31 the circumferential positions of which fall in the range of 0 to 360°. Furthermore, the first part (a1) of the first section (a) and the second part (b2) of the second section (b) are received in the same slots 31 the circumferential positions of which fall in the range of 0 to 180°; the second part (a2) of the first section (a) and the first part (b1) of the second section (b) are received in the same slots 31 the circumferential positions of which fall in the range of 180 to 360°.

Accordingly, in the comparative example, for each of the phase windings 41 of the stator coil 40, the first section (a) of the phase winding 41 is received in the same single-phase slots 31 for the phase winding 41 as the second section (b) of the phase winding 41. Consequently, it is impossible to achieve the same advantages as the stator 20 according to the third embodiment.

Fourth Embodiment

This embodiment illustrates a stator 20 which has a similar configuration to the stator 20 according to the first embodiment; accordingly, only the differences therebetween will be described hereinafter.

In the present embodiment, as in the second embodiment (see FIG. 12), each of the phase windings 41 of the stator coil 40 is comprised of j sub-windings 42 that are connected in parallel with each other between the terminal 43 of the phase winding 41 and the neutral portion 44 of the stator coil 40, where j is a natural number greater than or equal to 2. Moreover, each of the sub-windings 42 includes k sections that are sequentially arranged from one end of the sub-winding 42 on the terminal 43 side to the other end of the sub-winding 42 on the neutral point 44 side, where k is a natural number greater than or equal to 2. Further, in the present embodiment, counting from one end of the phase winding 41 on the terminal 43 side, the same-numbered sections of the sub-windings 42 of the phase winding 41 are received in the same ones of the single-phase slots 31 for the phase winding 41 so as to be proximate to one another in the same single-phase slots 31.

Specifically, assume that j is equal to 2 and k is equal to 4. Then, referring again to FIG. 12, each of the phase windings 41 of the stator coil 40 is comprised of a first sub-winding 42-1 and a second sub-winding 42-2 that are connected in parallel with each other between the terminal 43 of the phase winding 41 and the neutral point 44 of the stator coil 40. The first sub-winding 42-1 includes a first section (1a), a second section (1b), a third section (1c) and a fourth section (1d), which are sequentially arranged from one end of the first sub-winding 42-1 on the terminal 43 side to the other end of the first sub-winding 42-1 on the neutral point 44 side. The second sub-winding 42-2 includes a first section (2a), a second section (2b), a third section (2c) and a fourth section (2d), which are sequentially arranged from one end of the second sub-winding 42-2 on the terminal 43 side to the other end of the second sub-winding 42-2 on the neutral point 44 side.

Figure 17:
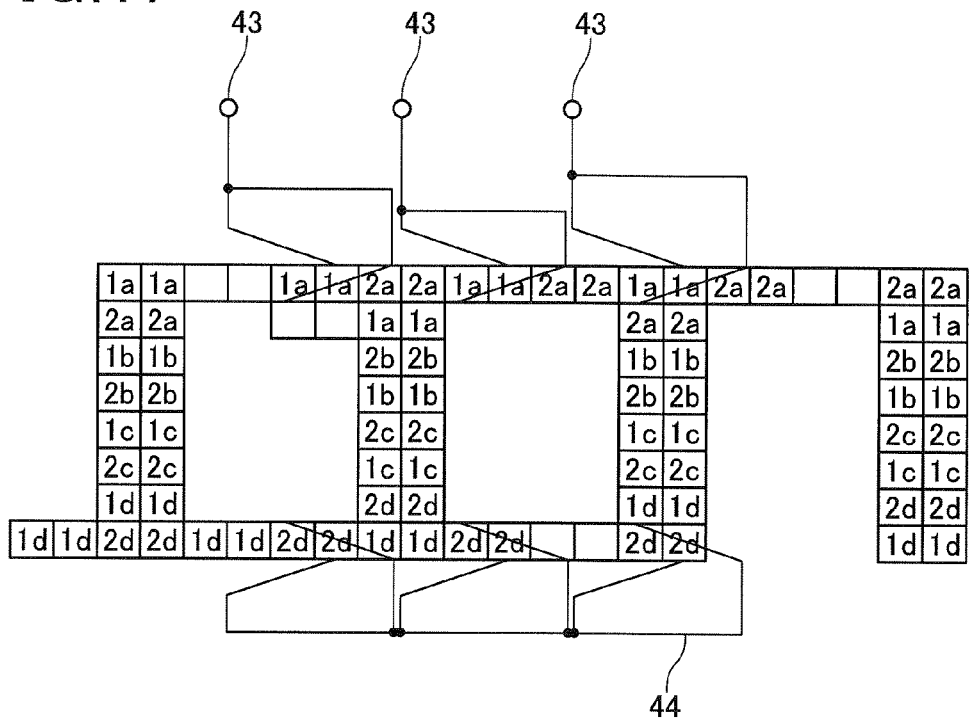
FIG. 17 is a schematic view illustrating the positions of sections of sub-windings of each phase winding of a stator coil in corresponding single-phase slots of a stator core in a stator according to a fourth embodiment.

Moreover, as shown in FIG. 17, for each of the phase windings 41, the first sections (1a, 2a) of the first and second sub-windings 42-1 and 42-2 of the phase winding 41 are received in the same ones of the single-phase slots 31 for the phase winding 41 so as to be proximate to each other in the same single-phase slots 31. The second sections (1b, 2b) of the first and second sub-windings 42-1 and 42-2 of the phase winding 41 are received in the same ones of the single-phase slots 31 for the phase winding 41 so as to be proximate to each other in the same single-phase slots 31. The third sections (1c, 2c) of the first and second sub-windings 42-1 and 42-2 of the phase winding 41 are received in the same ones of the single-phase slots 31 for the phase winding 41 so as to be proximate to each other in the same single-phase slots 31. The fourth sections (1d, 2d) of the first and second sub-windings 42-1 and 42-2 of the phase winding 41 are received in the same ones of the single-phase slots 31 for the phase winding 41 so as to be proximate to each other in the same single-phase slots 31. More specifically, in the present embodiment, in each of the single-phase slots 31 for the phase winding 41, all of the sections of the first and second sub-windings 42-1 and 42-2 of the phase winding 41 are radially arranged from the radially outer side in the sequence of 1a, 2a, 1b, 2b, 1c, 2c, 1d, 2d or in the sequence of 2a, 1a, 2b, 1b, 2c, 1c, 2d, 1d.

With the above arrangement, for the first sub-winding 42-1, the first and second sections (1a, 1b) are radially separated from the third and fourth sections (1c, 1d), thereby weakening the magnetic coupling between the first and second sections (1a, 1b) and the third and fourth sections (1c, 1d). Similarly, for the second sub-winding 42-2, the first and second sections (2a, 2b) are radially separated from the third and fourth sections (2c, 2d), thereby weakening the magnetic coupling between the first and second sections (2a, 2b) and the third and fourth sections (2c, 2d). Consequently, it is possible to minimize the decrease in the total inductance of the stator coil 40 due to the negative mutual inductances between the first and second sections (1a, 1b) and the third and fourth sections (1c, 1d) of the first sub-winding 42-1 and between the first and second sections (2a, 2b) and the third and fourth sections (2c, 2d) of the second sub-winding 42-2, thereby lowering both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

In addition, for each of the phase windings 41 of the stator coil 40, in each of the single-phase slots 31 for the phase winding 41, all of the sections of the first and second sub-windings 42-1 and 42-2 of the phase winding 41 may also be radially arranged from the radially outer side in different sequences, for example in the sequence of 1a, 1b, 2a, 2b, 1c, 1d, 2c, 2d.

Fifth Embodiment

In the present embodiment, as in the fourth embodiment, for each of the phase windings 41 of the stator coil 40, counting from one end of the phase winding 41, the same-numbered sections of the sub-windings 42 of the phase winding 41 are received in the same ones of the single-phase slots 31 for the phase winding 41 so as to be proximate to one another in the same single-phase slots 31.

Further, in the present embodiment, for each of the sub-windings 42, the first to the (k/2)th sections of the sub-winding 42 are received in different ones of the single-phase slots 31 for the phase winding 41 from the (k/2+1)th to the kth sections of the sub-winding 42.

Figure 18:
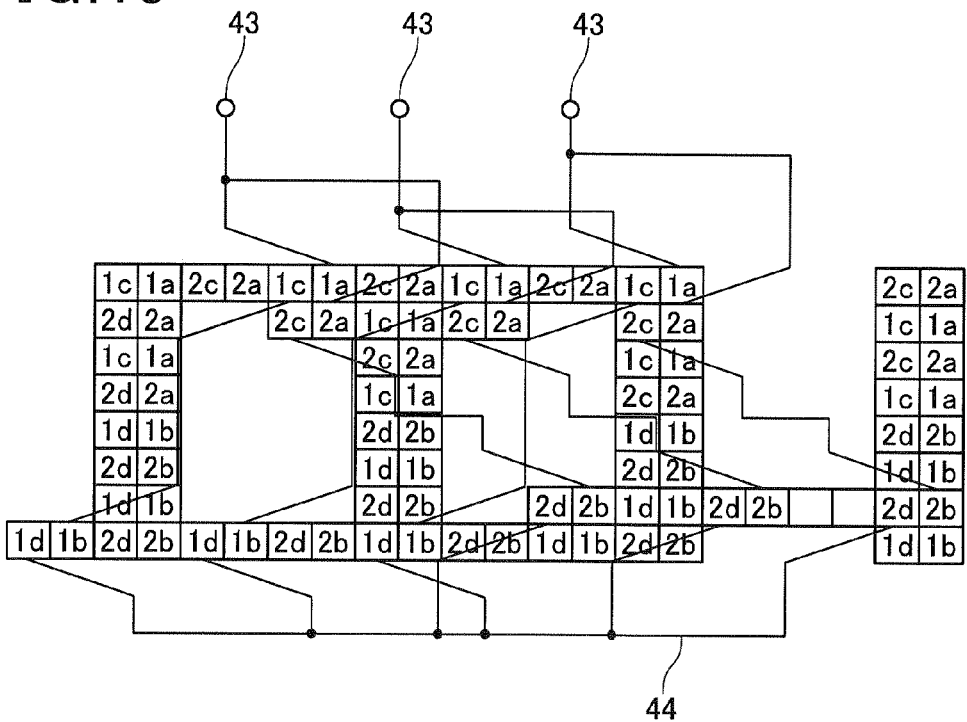
FIG. 18 is a schematic view illustrating the positions of sections of sub-windings of each phase winding of a stator coil in corresponding single-phase slots of a stator core in a stator according to a fifth embodiment.

Specifically, assume that j is equal to 2 and k is equal to 4 as in the fourth embodiment. Then, as shown in FIG. 18, for each of the phase windings 41 of the stator coil 40, the first sections (1a, 2a) of the first and second sub-windings 42-1 and 42-2 are received in the same ones of the single-phase slots 31 for the phase winding 41 so as to be proximate to each other in the same single-phase slots 31. The second sections (1b, 2b) of the first and second sub-windings 42-1 and 42-2 are received in the same ones of the single-phase slots 31 for the phase winding 41 so as to be proximate to each other in the same single-phase slots 31. The third sections (1c, 2c) of the first and second sub-windings 42-1 and 42-2 are received in the same ones of the single-phase slots 31 for the phase winding 41 so as to be proximate to each other in the same single-phase slots 31. The fourth sections (1d, 2d) of the first and second sub-windings 42-1 and 42-2 are received in the same ones of the single-phase slots 31 for the phase winding 41 so as to be proximate to each other in the same single-phase slots 31.

Further, in the present embodiment, for each of the phase windings 41 of the stator coil 40, the first and second sections (1a, 1b, 2a, 2b) of the first and second sub-windings 42-1 and 42-2 are received in different ones of the single-phase slots 31 for the phase winding 41 from the third and fourth sections (1c, 1d, 2c, 2d) of the first and second sub-windings 42-1 and 42-2. More specifically, in one of the single-phase slots 31 for the phase winding 41, the first and second sections (1a, 1b, 2a, 2b) of the first and second sub-windings 42-1 and 42-2 are radially arranged from the radially outer side in the sequence of 1a, 2a, 1a, 2a, 1b, 2b, 1b, 2b. In another one of the single-phase slots 31 for the phase winding 41, the third and fourth sections (1c, 1d, 2c, 2d) of the first and second sub-windings 42-1 and 42-2 are radially arranged from the radially outer side in the sequence of 1c, 2c, 1c, 2c, 1d, 2d, 1d, 2d.

With the above configuration of the stator 20 according to the present embodiment, since the first and second sections (1a, 1b, 2a, 2b) of the first and second sub-windings 42-1 and 42-2 are received in different ones of the single-phase slots 31 for the phase winding 41 from the third and fourth sections (1c, 1d, 2c, 2d) of the first and second sub-windings 42-1 and 42-2, it is possible to weaken the magnetic coupling between the first and second sections (1*a*, 1*b*, 2*a*, 2*b*) and the third and fourth sections (1*c*, 1*d*, 2*c*, 2*d*). Moreover, since the same-numbered sections of the first and second sub-windings 42-1 and 42-2 are received in the same single-phase slots 31 so as to be proximate to one another, all the sections of the sub-windings 42 can be arranged so that: the first and second sections (1*a*, 1*b*) of the first sub-winding 42-1 are radially separated from each other; the third and fourth sections (1*c*, 1*d*) of the first sub-winding 42-1 are radially separated from each other; the first and second sections (2*a*, 2*b*) of the second sub-winding 42-2 are radially separated from each other; and the third and fourth sections (2*c*, 2*d*) of the second sub-winding 42-2 are radially separated from each other. Consequently, it is possible to weaken the magnetic coupling between the sections (1*a*-1*d*) of the first sub-winding 42-1 and between the sections (2*a*-2*d*) of the second sub-winding 42-2. Thus, it is possible to minimize the decrease in the total inductance of the stator coil 40 due to the negative mutual inductances between the sections (1*a*-1*d*, 2*a*-2*d*) of the sub-windings 42 of the phase windings 41, thereby lowering both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

In addition, in the present embodiment, in the case of k being an odd number greater than 2, for each of the sub-windings 42, the central section of the sub-winding 42 may be received either in the same single-phase slots 31 as those sections of the sub-winding 42 which are positioned upstream (i.e., on the terminal 43 side) of the central section or in the same single-phase slots 31 as those sections of the sub-winding 42 which are positioned downstream (i.e., on the neutral point 44 side) of the central section.

Sixth Embodiment

This embodiment illustrates a stator 20 which has a similar configuration to the stator 20 according to the first embodiment; accordingly, only the differences therebetween will be described hereinafter.

In the present embodiment, the stator core 30 has, for each of the phase windings 41 of the stator coil 40, 2j circumferentially-consecutive single-phase slots 31, in which only the phase winding 41 is received, per magnetic pole of the rotor 14, where j is a natural number greater than or equal to 2. Moreover, each of the phase windings 41 of the stator coil 40 is comprised of j sub-windings 42 that are connected in parallel with each other between the terminal 43 of the phase winding 41 and the neutral portion 44 of the stator coil 40. Further, each of the sub-windings 42 consists of a first half on the terminal 43 side and a second half on the neutral point 44 side. Furthermore, in each of the single-phase slots 31 for the phase winding 41, there is received only a corresponding one of the first and second halves of the sub-windings 42 of the phase winding 41.

Figure 19:
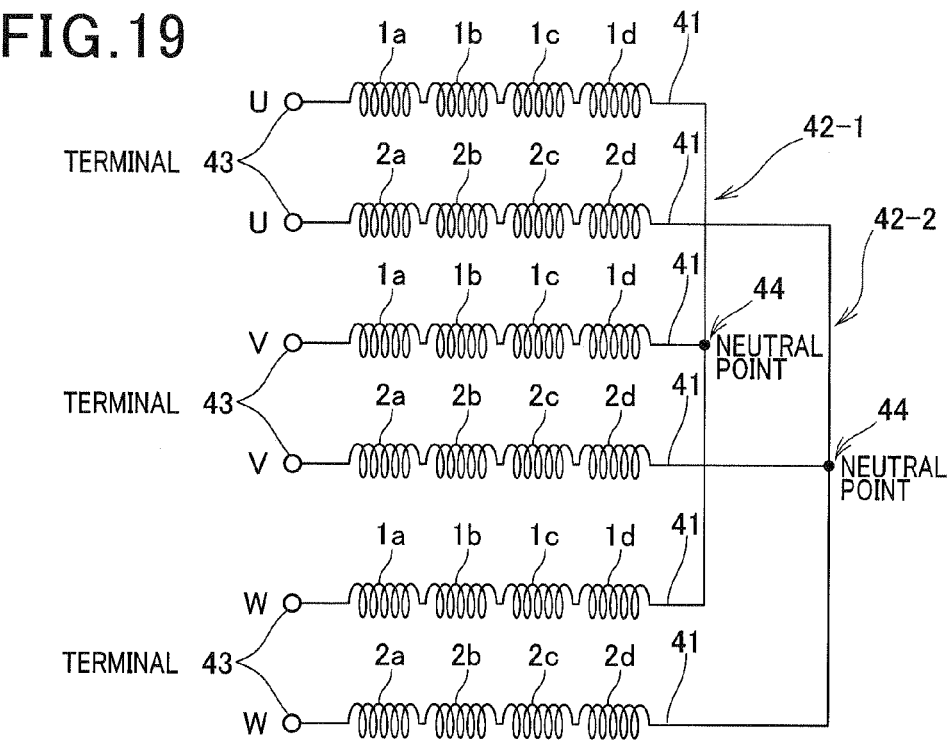
FIG. 19 is a connection diagram of phase windings of a stator coil of a stator according to a sixth embodiment.
Figure 20:
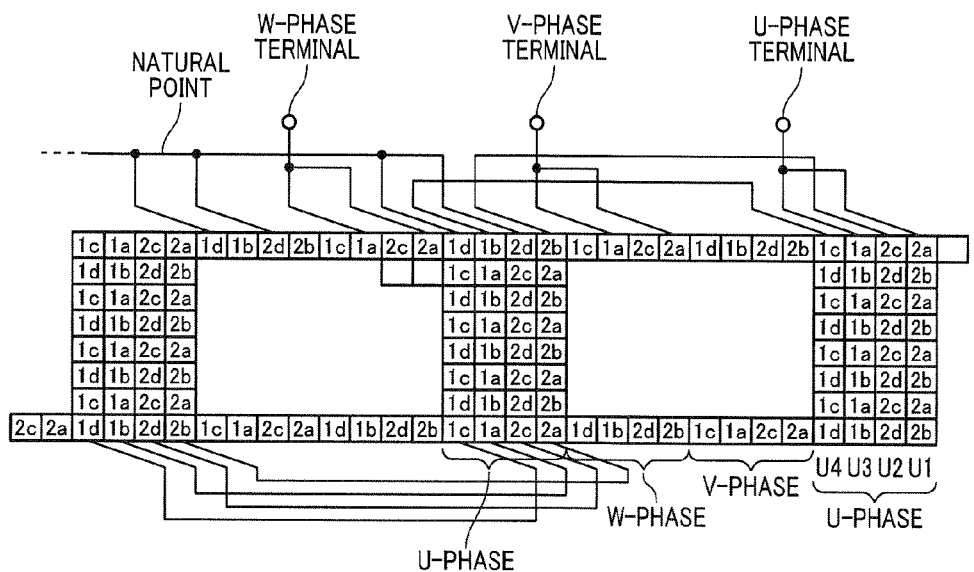
FIG. 20 is a schematic view illustrating the positions of sections of sub-windings of each phase winding of the stator coil in corresponding single-phase slots of a stator core of the stator according to the sixth embodiment.

Specifically, assume that j is equal to 2. Then, as shown in FIGS. 19 and 20, the stator core 30 has, for each of the phase windings 41 of the stator coil 40, four circumferentially-consecutive single-phase slots 31 per magnetic pole of the rotor 14. Accordingly, the total number of the slots 31 provided in the stator core 30 is equal to 96 (i.e., 4×3×8). Moreover, each of the phase windings 41 of the stator coil 40 is comprised of two sub-windings 42, i.e., a first sub-winding 42-1 and a second sub-winding 42-2 that are connected in parallel with each other between the terminal 43 of the phase winding 41 and the neutral point 44 of the stator coil 40. The first sub-winding 42-1 includes a first section (1*a*), a second section (1*b*), a third section (1*c*) and a fourth section (1*d*), which are sequentially arranged from one end of the first sub-winding 42-1 on the terminal 43 side to the other end of the first sub-winding 42-1 on the neutral point 44 side. The second sub-winding 42-2 includes a first section (2*a*), a second section (2*b*), a third section (2*c*) and a fourth section (2*d*), which are sequentially arranged from one end of the second sub-winding 42-2 on the terminal 43 side to the other end of the second sub-winding 42-2 on the neutral point 44 side.

Furthermore, taking the U-phase winding 41 as an example, as shown in FIG. 20, the first half of the second sub-winding 42-2, which is comprised of the first and second sections (2*a*, 2*b*) of the second sub-winding 42-2, is received in the single-phase slots U1. The second half of the second sub-winding 42-2, which is comprised of the third and fourth sections (2*c*, 2*d*) of the second sub-winding 42-2, is received in the single-phase slots U2. The first half of the first sub-winding 42-1, which is comprised of the first and second sections (1*a*, 1*b*) of the first sub-winding 42-1, is received in the single-phase slots U3. The second half of the first sub-winding 42-1, which is comprised of the third and fourth sections (1*c*, 1*d*) of the first sub-winding 42-1, is received in the single-phase slots U4.

That is, in the present embodiment, all the first and second halves of the first and second sub-windings 42-1 and 42-2 of the U-phase winding 41 are separately received in different ones of the single-phase slots U1-U4 for the U-phase winding 41 from each other.

In addition, in the present embodiment, in each of the single-phase slots U1, the first and second sections (2*a*, 2*b*) of the second sub-winding 42-2 are alternately arranged in eight layers. In each of the single-phase slots U2, the third and fourth sections (2*c*, 2*d*) of the second sub-winding 42-2 are alternately arranged in eight layers. In each of the single-phase slots U3, the first and second sections (1*a*, 1*b*) of the first sub-winding 42-1 are alternately arranged in eight layers. In each of the single-phase slots U4, the third and fourth sections (1*c*, 1*d*) of the first sub-winding 42-1 are alternately arranged in eight layers.

Figure 21:
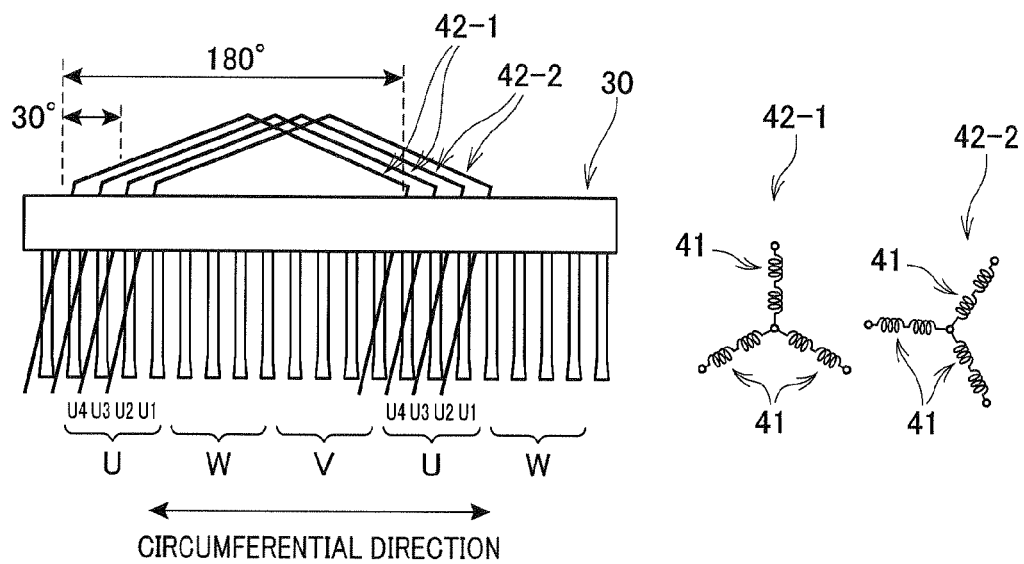
FIG. 21 is a schematic view illustrating the difference in electrical angle between the sub-windings of each phase winding of the stator coil in the stator according to the sixth embodiment.

Furthermore, as shown in FIG. 21, the difference in electrical angle between the first half of the second sub-winding 42-2 received in the single-phase slots U1 and the first half of the first sub-winding 42-1 received in the single-phase slots U3 is equal to 30°. The difference in electrical angle between the second half of the second sub-winding 42-2 received in the single-phase slots U2 and the second half of the first sub-winding 42-1 received in the single-phase slots U4 is also equal to 30°.

That is, in the present embodiment, the first and second sub-windings 42-1 and 42-2 are wound on the stator core 30 so as to be circumferentially offset from each other by 30° in electrical angle.

In addition, it should be noted that the first and second halves of the sub-windings 42 of the V-phase and W-phase windings 41 are respectively arranged in the single-phase slots 31 for the V-phase and W-phase windings 41 in the same manner as those of the U-phase winding 41.

With the above configuration of the stator 20 according to the present embodiment, for each of the sub-windings 42 of the phase windings 41 of the stator coil 40, it is possible to weaken the magnetic coupling between the first and second halves of the sub-winding 42, thereby minimizing the negative mutual inductance therebetween. Consequently, it is possible to minimize the decrease in the total inductance of the stator coil 40 due to the negative mutual inductance, thereby lowering both the resonant frequency and the resonance peak of the stator coil 40. As a result, it is possible to lower the maximum phase-to-phase voltage of the stator coil 40, thereby shortening the necessary phase-to-phase clearance of the stator coil 40 for ensuring electrical insulation between the phase windings 41 of the stator coil 40.

Moreover, since the sub-windings 42 are circumferentially offset from each other by an electrical angle of 30° (i.e., 60°/j, where j is equal to 2) in each of the phase windings 41 of the stator coil 40, it is possible to reduce variation in magnetomotive force in the circumferential direction of the stator core 30, thereby lowering the level of magnetic noise in the stator 20.

In addition, it is possible to modify the stator 20 according to the present embodiment such that each of the phase windings 41 of the stator coil 40 is formed by joining a give number of continuous electric wires instead of joining the U-shaped electric conductor segments 50. It is also possible to modify the stator 20 according to the present embodiment such that each of the phase windings 41 is lap-wound around the stator core 30 instead of being wave-wound around the stator core 30.

Experiment 2

This experiment has been conducted to verify the effect of reducing magnetic noise according to the sixth embodiment.

Specifically, in the experiment, both the stator 20 according to the sixth embodiment and a stator 20 according to a comparative example were tested.

Figure 22:
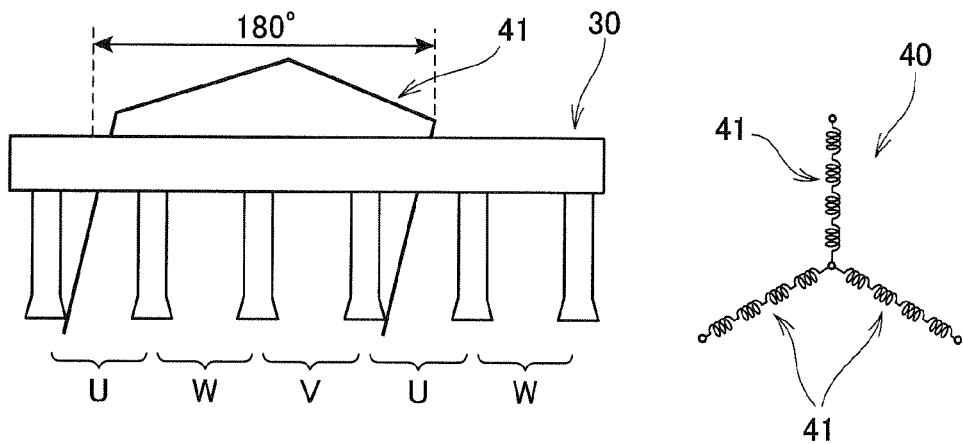
FIG. 22 is a schematic view illustrating the configuration of a stator according to a comparative example of the sixth embodiment.

In the stator 20 according to the comparative example, as shown in FIG. 22, the stator core 30 has, for each of the phase windings 41 of the stator coil 40, only one single-phase slot per magnetic pole of the rotor 14. Further, each of the phase windings 41 is not comprised of parallel sub-windings as in the sixth embodiment.

Figure 23:
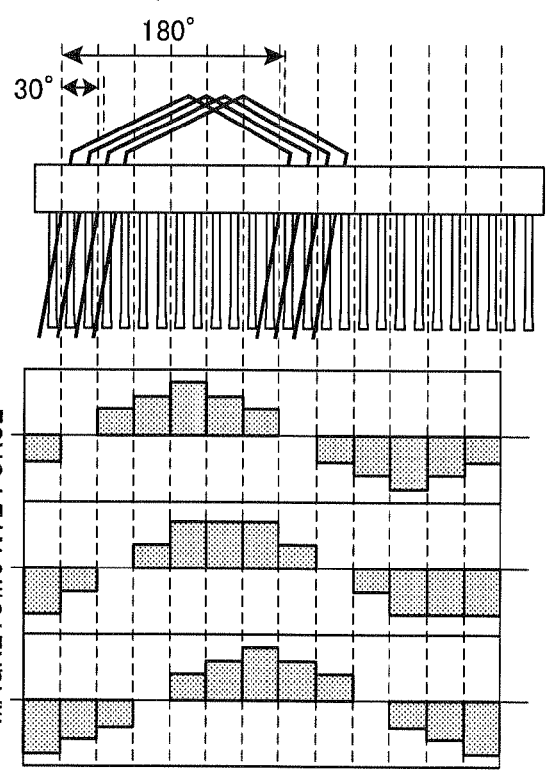
FIG. 23 is a view showing the distribution of magnetomotive force in the stator according to the sixth embodiment.

FIG. 23 shows the distribution of magnetomotive force in the stator 20 according to the sixth embodiment, which was measured in the experiment. On the other hand, FIG. 24 shows the distribution of magnetomotive force in the stator 20 according to the comparative example, which was also measured in the experiment.

Figure 24:
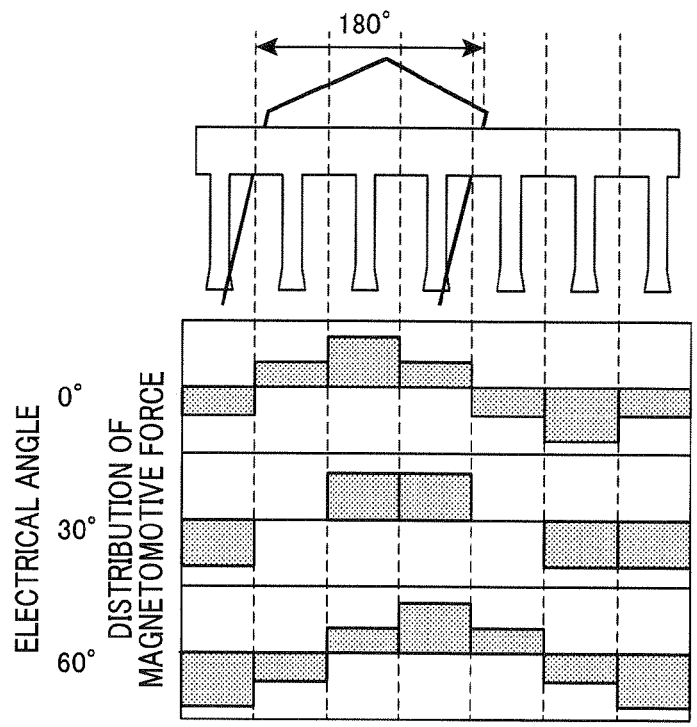
FIG. 24 is a view showing the distribution of magnetomotive force in the stator according to the comparative example of the sixth embodiment.

As seen from FIGS. 23 and 24, in either of the stators 20, the magnetomotive force varied in a cycle of 60° in electrical angle. The amount of variation in the magnetomotive force become maximum when electrical angle was changed from 0° to 30°. In addition, the larger the amount of variation in the magnetomotive force, the higher the level of the magnetic noise induced in the electric rotating machine 1.

Figure 25:
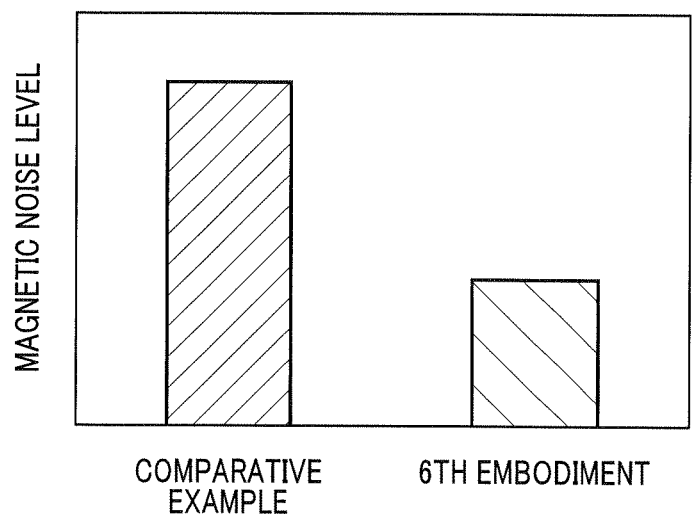
FIG. 25 is a graphical representation giving a comparison in magnetic noise level between the stator according to the sixth embodiment and the stator according to the comparative example.
Figures 26A, 26B:
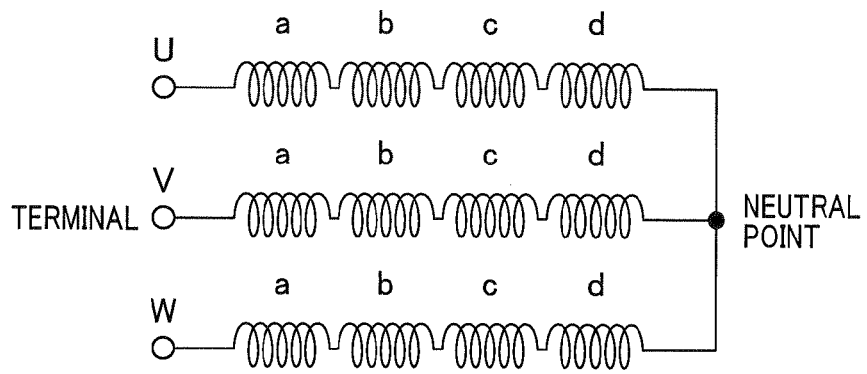
FIG. 26A is a connection diagram of phase windings of a stator coil of a stator known in the prior art.
FIG. 26B is a schematic view illustrating the positions of sections of sub-windings of each phase winding of the stator coil in corresponding single-phase slots of a stator core of the stator known in the prior art.

FIG. 25 gives a comparison in magnetic noise level between the stator 20 according to the sixth embodiment and the stator 20 according to the comparative example. Here, the magnetic noise level was obtained by integrating the amount of variation in the magnetomotive force for the range of electrical angle from 0° to 60°.

It can be seen from FIG. 25 that the magnetic noise level in the stator 20 according to the sixth embodiment was lowered below half the magnetic noise level in the stator 20 according to the comparative example.

While the above particular embodiments have been shown and described, it will be understood by those skilled in the art that various modifications, changes, and improvements may be made without departing from the spirit of the invention.

For example, in the first embodiment, each of the U-phase, V-phase and W-phase windings 41 of the stator coil 40 is configured to include 2n sections, where n is a natural number greater than or equal to 2. However, each of the U-phase, V-phase and W-phase windings 41 of the stator coil 40 may also be configured to include k sections, where k is a natural number greater than or equal to 2.

Moreover, in the first embodiment, the substantially U-shaped electric conductor segments 50 are used for forming the stator coil 40. However, electric conductor segments of other shapes (e.g., substantially I-shaped electric conductor segments) may also be used, instead of the substantially U-shaped electric conductor segments 50, for forming the stator coil 40.

In the previous embodiments, the present invention is directed to the electric rotating machine 1 which is designed to function as an electric motor. However, the invention can also be applied to other electric rotating machines, such as an electric generator or a motor-generator that can functions both as an electric motor and as an electric generator.

What is claimed is:

1. An electric rotating machine comprising:
    a rotor having a plurality of pairs of magnetic poles that are arranged in a circumferential direction of the rotor; and
    a stator including a stator core and a stator coil, the stator core having a plurality of slots, which are arranged in a circumferential direction of the stator core, and being radially opposed to the rotor, the stator coil being comprised of a plurality of phase windings each of which is wound on the stator core so as to be inserted in corresponding ones of the slots of the stator core,
    wherein
    the stator core has, for each of the phase windings of the stator coil, n circumferentially-consecutive single-phase slots, in which only the phase winding is received, per magnetic pole of the rotor, where n is a natural number greater than or equal to 2,
    each of the phase windings of the stator coil is comprised of j sub-windings that are connected in parallel with each other between opposite ends of the phase winding, where j is a natural number greater than or equal to 2,
    each of the sub-windings includes k sections that are sequentially arranged from one end of the sub-winding to the other end of the sub-winding, where k is a natural number greater than or equal to 2, and
    the first to the (k/2)th sections are received in different ones of the single-phase slots for the phase winding from the (k/2+1)th to the kth sections.

2. The electric rotating machine as set forth in claim 1, wherein k is equal to 2n so that for each sub-winding of each phase winding of the stator coil, the first section is received in different ones of the single-phase slots for the phase winding from the 2nth section.

3. The electric rotating machine as set forth in claim 2, wherein for each sub-winding of each phase windings of the stator coil, a 2mth section of the phase winding is received in the same ones of the single-phase slots for the phase winding as a (2m−1)th section of the phase winding, where m is a natural number that satisfies 1≤m≤n.

4. The electric rotating machine as set forth in claim 1, wherein for each of the phase windings of the stator coil, each of the first to the kth sections of the phase winding is wave-wound on the stator core.

5. The electric rotating machine as set forth in claim 1, wherein each of the phase windings of the stator coil is comprised of a plurality of electric conductor segments that are inserted in the single-phase slots for the phase winding and electrically connected in series with one another,
    on one axial side of the stator core, each corresponding pair of in-slot portions of the electric conductor segments, which are received in the single-phase slots for the phase winding, are connected by a turn portion, on the other axial side of the stator core, each corresponding pair of end parts of the electric conductor segments are joined together to form a joint therebetween, all of the turn portions connecting the in-slot portions of the electric conductor segments of the phase windings together make up a first coil end of the stator coil on the one axial side of the stator core, and all of the end parts of the electric conductor segments of the phase windings and the joints formed between the end parts together make up a second coil end of the stator coil on the other axial side of the stator core.

6. The electric rotating machine as set forth in claim 1, wherein a maximum voltage applied between terminals of the phase windings of the stator coil is set to be higher than or equal to 330 V.

* * * * *